(12) United States Patent
Abedi et al.

(10) Patent No.: US 8,934,425 B2
(45) Date of Patent: Jan. 13, 2015

(54) IMPROVEMENTS TO SHORT-RANGE WIRELESS NETWORKS

(75) Inventors: Saied Abedi, Reading (GB); Hind Chebbo, Cowley (GB)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 13/254,079

(22) PCT Filed: Feb. 9, 2010

(86) PCT No.: PCT/EP2010/051594
§ 371 (c)(1),
(2), (4) Date: Nov. 14, 2011

(87) PCT Pub. No.: WO2010/100014
PCT Pub. Date: Sep. 10, 2010

(65) Prior Publication Data
US 2012/0063397 A1    Mar. 15, 2012

(30) Foreign Application Priority Data

Mar. 4, 2009 (EP) ..................... 09154364

(51) Int. Cl.
*H04W 4/00*     (2009.01)
*G08B 1/08*     (2006.01)
(Continued)

(52) U.S. Cl.
CPC .......... *H04W 72/1205* (2013.01); *H04W 84/18* (2013.01)
USPC ............................ 370/329; 340/539.12; 705/2

(58) Field of Classification Search
CPC ........................ H04W 72/1205; H04W 84/18
USPC ............................ 370/329; 340/539.12; 705/2
See application file for complete search history.

(56) References Cited

U.S. PATENT DOCUMENTS

2006/0031378 A1  2/2006 Vallapureddy et al.
2006/0092907 A1*  5/2006 Shimokawa et al. ......... 370/347
(Continued)

FOREIGN PATENT DOCUMENTS

WO    2007/083586    7/2007

OTHER PUBLICATIONS

A. El-Hoiydi, et al, "WiseMAC: An Ultra Low Power MAC Protocol for the Downlink of Infrastructure Wireless Sensor Networks," ISCC, pp. 244-251, Jun. 2004.
(Continued)

*Primary Examiner* — Noel Beharry
*Assistant Examiner* — Farhad Ali
(74) *Attorney, Agent, or Firm* — Staas & Halsey LLP

(57) ABSTRACT

The invention relates to a wireless network of devices including a network device and a coordinator; the coordinator comprising transmission and reception means for wireless communication; and the network device comprising transmission means and reception means for wireless communication; and control means operable to selectively cause the device to communicate according to two different channel access schemes, a higher throughput scheme and a lower throughput scheme; wherein a trigger is provided in the network for a switch from the lower throughput scheme to the higher throughput scheme, wherein the trigger is determined taking into account the network device's transmission requirements. The transmission requirements may be based on a network according to the present invention, wherein the transmission requirements are defined based on one or more of the following factors: data waiting in the network device's buffer, emergency status of a device, urgency status of a device and battery level.

15 Claims, 32 Drawing Sheets

(51) Int. Cl.
*G06Q 10/00* (2012.01)
*H04W 72/12* (2009.01)
*H04W 84/18* (2009.01)

(56) References Cited

U.S. PATENT DOCUMENTS

| | | | |
|---|---|---|---|
| 2008/0291855 A1 | 11/2008 | Bata et al. | |
| 2009/0052463 A1 | 2/2009 | Chen et al. | |
| 2009/0063187 A1* | 3/2009 | Johnson et al. | 705/2 |
| 2009/0116462 A1* | 5/2009 | Powell et al. | 370/338 |
| 2010/0178900 A1* | 7/2010 | Cheng et al. | 455/414.1 |

OTHER PUBLICATIONS

Xiaolei Shi, et al, SyncWUF: An Ultra Low-Power MAC protocol for Wireless Sensor Networks, IEEE Transactions on Mobile Computing, vol. 6, No. 1, Jan. 2007.

Ana Liu, et al., "An Energy-efficiency and Collision-Free MAC Protocol for Wireless Sensor Networks," IEEE, 2005, pp. 1317-1322.

P. Hurni, et al., "Increasing Throughput for WiseMAC," WONS 2008.

Ming Ma, et al, "Multi-Channel Polling in Multi-Hop Clusters of Hybrid Sensor Networks," IEEE Globecom, 2005.

Jerome Rousselot, "IEEE P802.15 Working Group for Wireless Personal Area Networks (WPANs)," IEEE, Jul. 2008.

IEEE 802.15.4-2006 Standard, Sep. 8, 2003.

IEEE 802.15.3-2003 Standard, Sep. 29, 2003.

IEEE 802.15.6 Standard, Jun. 2011.

European Search Report issued Oct. 6, 2009 in European Application No. 09154363.7-1249.

International Search Report issued Apr. 6, 2010 in PCT/EP2010/051594.

Korean Office Action mailed Jan. 21, 2013 in corresponding Korean Patent Application No. 10-2011-7023348.

European Office Action mailed Feb. 12, 2013 for corresponding European Application No. 09154364.5.

Chinese Office Action issued on Jun. 10, 2014 in corresponding Chinese Patent Application No. 201080010644.9.

* cited by examiner

| Frame type value b2 b1 b0 | Description |
|---|---|
| 000 | Beacon |
| 001 | Data |
| 010 | Acknowledgment |
| 011 | MAC command |
| 100-111 | Reserved |

| Battery charge level | Battery status bits |
|---|---|
| 0% - 25% | 00 |
| 25% - 50% | 01 |
| 50% - 75% | 10 |
| 75% - 100% | 11 |

FIG. 17

| Battery | | Sleep Pattern | | | |
|---|---|---|---|---|---|
| bits:b1b2 | Levels | Low Wakeup | Medium Wakeup | High Wakeup | Continuous Wakeup |
| 00 | L1=0%-25% | ✓ | ✗ | ✗ | ✗ |
| 01 | L2=25%-50% | ✓ | ✓ | ✗ | ✗ |
| 10 | L3=50%-75% | ✓ | ✓ | ✓ | ✗ |
| 11 | L4= 75%-100% | ✓ | ✓ | ✓ | ✓ |

| Bits: 0-2 | 3 | 4 | 5 | 6 | 7 | 8-9 | 10-11 | 12-13 | 14-15 | Extended bit: 0 | Extended bit: 1 | Extended bit: 2 | Extended bit: 3 |
|---|---|---|---|---|---|---|---|---|---|---|---|---|---|
| Frame Type | Security Enabled | Frame Pending | ACK Request | PAN ID Compression | Emergency | ACK types | Destination Addressing Mode | Frame Version | Source Addressing Mode | Urgent 1 | Urgent 2 | Battery Level 1 | Battery Level 2 |
| | | | | | | | | | | 81 | 82 | 83 | 84 |

FIG. 29

| Frame Type Value b2b1b0 | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

FIG. 31

| Frame Type Value (3 bits) | Description |
|---|---|
| 000 | Beacon frame |
| 001 | Data frame |
| 010 | ACK |
| 011 | MAC command |
| 100 | Immediate Ack |
| 101- | Delayed Ack |
| 111 | Emergency |

FIG. 30

| Frame header | | | | |
|---|---|---|---|---|
| Frame control | | | | |
| Frame Type (3bits) | ACK Policy (two bits) | Emergency (1 bit) | Urgency levels (two bits) | battery Levels (Two bits) |
| | ...... | ...... | ............ | ............ |

| Octets | 1 | (see 7.2.2.4.1) | 0/5/6/10/14 | 1 | Variable | 2 |
|---|---|---|---|---|---|---|
| Frame control | Sequence Number | Addressing fields | Auxiliary Security Header | Command Frame Identifier | Command Payload | FCS |
| MHR | | | | MAC Payload | | MFR |

FIG. 32

| Command frame identifier | Command name | RFD Tx | RFD Rx | Subclause |
|---|---|---|---|---|
| 0x01 | Association request | X | | 7.3.1 |
| 0x02 | Association response | | X | 7.3.2 |
| 0x03 | Disassociation notification | X | X | 7.3.3 |
| 0x04 | Data request | X | | 7.3.4 |
| 0x05 | PAN ID conflict notification | X | | 7.3.5 |
| 0x06 | Orphan notification | X | | 7.3.6 |
| 0x07 | Beacon request | | | 7.3.7 |
| 0x08 | Coordinator realignment | | X | 7.3.8 |
| 0x09 | GTS request | | | 7.3.9 |
| 0x0a-0xff | Reserved | | | - |

FIG. 33

IMPROVEMENTS TO SHORT-RANGE WIRELESS NETWORKS

CROSS REFERENCE TO RELATED APPLICATIONS

This application is a national phase application, under 35 U.S.C. 371, of international application No. PCT/EP2010/051594, filed on Feb. 9, 2010, which claimed priority to European Patent Application No. 09154364.5, filed on Mar. 4, 2009, the disclosures of which are incorporated herein by reference.

The present invention relates to wireless personal area networks and particularly, but not necessarily exclusively, to wireless sensor networks and to body area networks including wirelessly-communicating sensors disposed on or around a human or animal body.

The so-called Body Area Network or BAN is an example of wireless personal area networks (WPANs), used to convey information over relatively short distances.

Unlike wireless local area networks (WPANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of a patient. A BAN employing mainly sensors for feeding sensed data to a data sink (which may also be a network coordinator) is an example of a wireless sensor network (WSN); however, more active devices, such as actuators, may alternatively or additionally be included in a WSN acting as an MBAN.

Another interesting use of short-range wireless networks is in industrial monitoring. Such wireless networks may be designed to include sensors and other devices. For example, one deployment would include sensors arranged to measure a parameter such as temperature at various different positions on a turbine blade or other industrial part for monitoring. Again, more active devices can be included in such a wireless network and little or no infrastructure is required.

Standard IEEE 802.15.4 defines the physical layer (PHY) and medium access control (MAC) sublayer specifications for low data-rate WPANs, although the coverage of an IEEE 802.15.4 network may extend beyond a personal operating space (POS) which typically defines the WPAN and is thus also suitable for somewhat larger-scale industrial deployment. Such slightly larger-scale networks are included within the terms WSN, WPAN and BAN for the purposes of this application. IEEE 802.15.4 has some similarities with a standard for an ad-hoc piconet, IEEE 802.15.3. Such piconets around a person or object typically cover at least 10 m in all directions and envelop the person or object, whether stationary or in motion. They include higher data-rate WPANs. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs.

In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of sensors around a patient in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as 1 meter may be adequate. However, medical WSN applications are mission critical applications in the clinical environment. Robust wireless links for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas. Efforts are therefore in progress to define a further standard IEEE802.15.6 which aims to define the properties of Body Area Networks, particularly for medical applications.

One of the key requirements is IEEE802.15.3, IEEE802.15.4, IEEE802.15.6 and other standards related to wireless networks including network devices powered by batteries, is conserving a battery life. This is especially important for emergency situations in which the life of a patient depends on the liability of wireless links in medical applications, or for monitoring mission critical industrial environments such as power stations. However, this requirement must be balanced with the need to provide sufficient network throughput under normal conditions and also in emergency situations. Some channel access schemes are designed for high throughput of data whereas others are more suitable for low throughput, low power situations.

It would be advantageous for a network device to be able to switch from a lower throughput scheme to a higher throughput scheme. According to one aspect, embodiments of the invention provide a wireless network of devices including a network device and a coordinator; the coordinator comprising transmission and reception means for wireless communication with other devices in the network; and the network device comprising transmission means and reception means for wireless communication with other devices in the network; and control means operable to selectively cause the device to communicate according to two different channel access schemes, a higher throughput scheme and a lower throughput scheme; wherein a trigger is provided in the network for a switch from the lower throughput scheme to the higher throughput scheme, the trigger being defined taking into account the network device's transmission requirements.

The network of invention embodiments allows a network device such as a sensor not only to communicate according to one of two different channel access schemes, but also to undergo a switch from the lower throughput scheme to the higher throughput scheme as a result of a trigger which takes into account the network devices transmission requirements. The switch may be for downlink and/or uplink transmission.

A corresponding switch back to the lower throughput scheme may also be provided, as discussed in more detail later.

Thus invention embodiments provide a mechanism which allows the device's requirements to be taken into account to switch the channel access scheme. This is particularly useful for body area networks, in which a higher throughput may be essential in some emergency situations but in which there is a need to keep normal battery consumption as low as possible.

One of the major requirements of IEEE 802.15.6 is the issue of efficient channel access and radio resource management suitable for medical applications. Known channel access mechanisms have already been widely exploited by commercial standards such as IEEE 802.15.3 and IEEE 802.15.4, but without giving a special attention to medical devices and other devices which are subject to emergency conditions. Especially the issue of medical and industrial emergencies has not been reflected within the existing standards.

Now a switch between two channel access scheme, which may be contention based, such as WiseMAC and CSMA (preferably asynchronous CSMA) using a novel trigger is provided by invention embodiments, which can thus improve network function in these special cases.

The trigger is determined taking into account an increase in the network device's transmission requirements. These transmission requirements may be defined based on factors including data waiting in the device buffer for transmission, emergency status of device or an indication of urgency status of a device, for instance in the format of a changed sleep pattern or changed suitable sleep pattern of the device. Another trigger could be battery level. If the battery level of a device is very low it might that its transmission requirements rise in certain circumstances, because it will need to send an alert signal to the coordinator requesting a battery change/re-charge before the battery becomes completely depleted. Of these, the emergency status of the device and indication of a changed sleep pattern or changed suitable sleep pattern are particularly suitable in the case in which the network device is a sensor. If on the other hand the trigger takes into account data waiting in the device buffer it is much more generally applicable. Of course each trigger can be determined into taking account a combination of any or all of these factors, as explained in more detail hereinafter.

Once a trigger has been provided taking the network device's transmission requirements into account, it is transmitted as necessary in the network. The trigger may be transmitted in any suitable fashion, possible within a data frame. Preferably, when the wireless network uses transmission frames, the transmission frames used can include a field for transmission of the trigger. There are several possibilities as to where the trigger can be created. For example, the trigger can be created by the coordinator and transmitted to the sensor or other network device. Alternatively, the trigger can be created in the network device and transmitted to the coordinator. The skilled reader will appreciate that the transmission may be indirect via other network nodes, depending on the network structure. Alternatively, the trigger can be created by a central monitoring unit or other entity and transmitted to the coordinator. The central monitoring unit can be in wired or wireless communication with the coordinator and thus be part of the sensor network or not depending on the specific deployment.

A central monitoring unit (also sometimes referred to as a central monitoring and medical care unit, in medical applications) can be a station with monitoring equipment capable of receiving continuous or occasional streams of emergency data from multiple stations (for example for multiple patients). The central monitoring unit may include operatives (such as nurses or medical specialists) whose role is to monitor the data received. These operatives can take action in response to changes in conditions, for example, in individual patients or industrial parts.

In any of these cases the trigger will need to be communicated to the relevant network entities. Moreover if more than one type of trigger is provided in the same network, one such trigger can be created in the network device with a different such trigger being created in the coordinator. Preferably, the network device transmission means and/or the coordinator transmission means is operable to transmit an indication of the trigger in a transmission frame. Correspondingly, reception means will be provided for the trigger at the other end of the transmission path, whether direct or indirect. The indication of the trigger could be in the form of a value set in a field such as a frame control field or frame command field. In one preferred embodiment, the value can be one or more bits acting in combination to designate a trigger. Advantageously, therefore a different value in such a field can act as a deactivation or "lifting" of the trigger and/or different values can correspond to different trigger levels.

The trigger can activate a switch instruction to the high throughput access scheme. However, under certain circumstances the switch instruction would not necessarily follow automatically from one trigger factor as will be explained in more detail below.

More than one factor can be combined to form a combined trigger. For example, the combined trigger can be based on a combination of urgency/emergency bits and battery level or more bits and battery level. Any other combination of the trigger factors discussed herein or other suitable trigger types can also be contemplated. The combination gives a more complex trigger which can be better suited to real-life applications. The two or more factors can be transmitted to/from the sensor in the same or opposite directions (or one or more of them might not be transmitted). It is their combination which forms the combined trigger and activates the switch.

A discontinued trigger can activate a switch back to the lower throughput channel access. However the switch back to the lower throughput scheme can also be influenced by discontinuation of one factor of a combined trigger, in some circumstances. In particular, a low battery charge of the network device may be a factor in a combined trigger so that the switch to the trigger throughput scheme is only carried out if the battery level is suitable, and there is emergency status but a low battery level can activate a switch back to a lower throughput channel access scheme.

In the same way as for the trigger (and trigger factors), the network device transmission schemes and coordinator transmission means may be operable to transmit an indication of the switch instruction. The switch instruction may be in a control/command field of a transmission frame as for the trigger. However in a preferred embodiment, the indication is sent in an acknowledgement frame (from the device that has received the trigger). The acknowledgement may be an immediate acknowledgement frame sent out directly after receipt of each single frame as known per se for WiseMAC. Alternatively it may be a different type of acknowledgement, for example a delayed acknowledgement frame being sent out only after completion of a data transfer and indicating as a payload how many frames were successfully received or a simple acknowledgement, similar to the delayed acknowledgement at having no pay load. Preferably, the acknowledgement is an immediate acknowledgement frame. The delayed acknowledgements allow different network functionality. In one embodiment, at least two types of acknowledgement are provided and network signalling can instruct which type is used.

Previously, we have referred to the coordinator and the network device in the network. However the network device may be one of a plurality of network devices. One or more of these may be a wireless sensor or actuator. The network may be operable to implement switches for at least one of the network devices and preferably for each network device that is battery powered. In some embodiments the switch instruction can be overheard and thus actioned by one or more of the other devices. For example, a trigger may be sent from one sensor activating a switch to a higher throughput channel access scheme for that sensor. The switch instruction can be overheard by neighbouring sensors which may then also use the higher throughput channel access scheme.

In situations where more than one network device is present in the network and more than one network device has switched to the higher throughput channel access scheme, there can be a problem that the increased throughput of lower priority network devices impedes the throughput of higher priority network devices. Priorities can be set according to the category of device (for example a critical medical device may have a high priority, a medical device may have a middling priority and a non-medical device may have a low priority) and/or the priorities may be set according to the transmission requirements of each network device. Thus for example, if the trigger can have various levels, a higher level trigger can have priority over a lower level trigger and the lower level trigger and the higher level trigger can both have priority over a network device in which the trigger has been deactivated/discontinued. The skilled reader will appreciate that the same control/command field of a transmission frame can provide sufficient values to distinguish between classes of devices and/or different trigger levels.

The priority assigned to each network device (whether taking the class of device or the transmission requirements or both into account) can be used to mitigate the problem of an overheard switch instruction. Specifically, the priority level of each device can be used to determine a transmission parameter which influences the chances of successful transmission. In one example, a shorter preamble or shorter back off is used for higher priority devices in CSMA for example.

There may come a point in which the number of devices which have been switched to the higher throughput channel access scheme, (because they have been specifically triggered or because they have overheard a switch instruction) leads to issues with certainty of network operation. Therefore preferably, the network is operable to switch devices to a guaranteed time slot (GTS), for example by switching to a third different channel access scheme, or by using different functionality in the higher throughput channel access scheme. Preferably, only the network devices which have been specifically triggered to switch to the higher throughput channel access scheme are then switched to the GTS. The third channel access may be synchronous such as TDMA/GTS with a beacon. The triggered network devices switched to GTS may switch back to contention-based after a predetermined number of time periods or once the number of triggered network devices falls below the threshold.

As mentioned above, there are a number of different scenarios for creation and transmission of the trigger and switch, each suitable for different circumstances and each influencing the extent to which the network can be said to centralised. In one embodiment, the trigger is created in the coordinator (or a central monitoring unit) and transmitted by the coordinator transmission means; and the switch is created in the network device and transmitted by the network device transmission means.

Alternatively, in a different embodiment a trigger is created in the network device and transmitted by the network device transmission means; and the switch is created in the coordinator (or a central monitoring unit) and transmitted by the coordinator transmission means. Finally, both the trigger and the switch may be created in the coordinator or a central monitoring unit and transmitted by the coordinator transmission means. Preferably, the trigger and/or the switch are created in the coordinator, so that some switching control is retained within the coordinator.

Preferably, both uplink and downlink transmission switch from the low-throughput to the high-throughput scheme at the time of the switch. Moreover, in many cases, a coordinator will not be able to support two different modes (e.g. WiseMAC and CSMA) at the same time for different network devices so the whole network will switch to the new mode for both downlink and uplink.

According to further aspects of the present invention there is provided a network device in a wireless network of devices including the network device and a coordinator, the network device comprising: transmission means and reception means for wireless communication with other devices in the network; and control means operable to selectively cause the device to communicate according to two different channel access schemes, a higher throughput scheme and a lower throughput scheme; wherein the transmission means and/or reception means are operable to transmit and/or receive respectively a trigger for a switch from the lower throughput scheme to the higher throughput scheme.

In preferred embodiments, the network device trigger is determined taking into account an increase in the network device's transmission requirements, for example based on data waiting in the device buffer, emergency status of the device, or an indication of a changed sleep pattern of the device as before.

In a first preferred embodiment, the network device transmission means are operable to transmit an indication that a further packet follows the packet for transmission. This indication may be used as the trigger, for example, in a control field or command field of a transmission frame using a predefined value.

In another preferred embodiment, the network device is a sensor comprising sensing means operable to detect values of a parameter; and its control means are additionally operable to control a sleep pattern of the sensor. Either the sensor transmission means can be operable to transmit value information as to the parameter values and the coordinator transmission means can be operable to transmit an indication of a suitable sensor sleep pattern taking into account the value information, or the sensor control means is operable to determine the suitable sleep pattern and transmit an indication of the suitable sleep pattern to the coordinator. In either case indication of a suitable sleep pattern can act as the trigger. That is, the indication of the suitable sleep pattern reflects the network device's transmission requirements.

In a further preferred embodiment, the network device is a sensor arranged to detect the value of a parameter and determining means are provided in the network responsive to the value to determine an emergency condition.

According to a still further aspect, embodiments of the invention provide a coordinator in a wireless network of devices including a network device and the coordinator, wherein the coordinator comprises transmission and reception means for wireless communication with other devices;

and control means operable to selectively cause the coordinator to communicate according to two different channel access schemes, a higher throughput scheme and a lower throughput scheme; wherein the transmission means and/or reception means are operable to transmit and/or receive respectively a trigger for a switch from the lower throughput scheme to the higher throughput scheme.

For a better understanding of the present invention, and to show more clearly how it may be carried into effect, reference will now be made, by way of example only, to the following drawings in which:

FIG. 17 is a table demonstrating an example of battery bits that can be used in a control field of a transmission frame to denote battery charge level;

FIG. 18 is a table demonstrating one way of associating predefined sleep patterns to levels of battery charge;

FIG. 28 shows the novel structure of a frame control field for use with embodiments of the invention;

FIG. 29 illustrates possible frame type bits in the frame control field of FIG. 28;

FIG. 30 shows another novel structure of a frame control field for use with embodiments of the invention;

FIG. 31 illustrates possible corresponding frame type bits;

FIG. 32 illustrates the basic format of a MAC frame in the current IEEE 802.15.4 standard; and FIG. 33 illustrates the Command Frame Identifier list of the current version of IEEE 802.15.4 standard.

Figure 1:
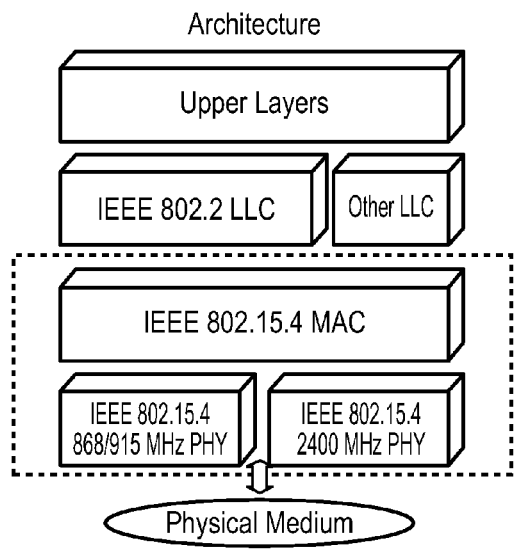
FIG. 1 illustrates protocol layers in an IEEE 802.15.4 WPAN.

Before explaining the embodiments of the present invention, some background explanation will first be given of channel access protocols (also known as multiple access protocols) used in wireless networks, followed by a summary of those parts of IEEE 802.15.4 which are expected to have relevance for the IEEE 802.15.6 standard currently under development, and/or for Body Area Networks including MBANs.

Multiple access refers to the possibility for multiple network devices in a wireless network to share the same radio channel. To enable multiple access, wireless networks are generally organised either based on frequency division (where transmissions from respective network devices are kept separate by using different frequencies) or on time division (where transmissions are separated by being performed at different times). It is possible to employ both frequency and time division at the same time. For the remainder of this description, reference will be made to time-division schemes although as the skilled person will realise, techniques analogous to those described may be applied also in the frequency-division case.

Time-division based networks typically divide time into equal time intervals called "frames". Various protocols have been devised which provide more or less reliability of communication (by which is meant the probability of a given transmission being successfully received) in accordance with the amount of information available to the network devices.

One known protocol, which is a packed-based protocol and which avoids the need for a timing reference, is called CSMA-CA for Carrier Sense Multiple Access with Collision Avoidance. In CSMA-CA, whenever a device wishes to transmit within the CAP, it waits for a random period. If the channel is found to be idle, following the random backoff, the device transmits its data. If the channel is found to be busy following the random backoff, the device waits for another random period before trying to access the channel again.

A further protocol known as TDMA for Time Division Multiple Access requires a network controller or coordinator to allocate time slots for the exclusive use of network devices so as to avoid the potential for collisions. However, this requires not only that a central coordinator be provided but also that all network devices listen for a beacon and for notification of the slot(s) allocated to them before starting transmission.

Different protocols may be used in the same network, for example for an uplink (i.e. data transmissions to a central point such as a coordinator or base station) and downlink (data transmissions to a network device such as sensor) respectively.

In this regard, one proposed protocol for the downlink of a WSN is called WiseMAC for Wireless sensor MAC. WiseMAC can be used in both downlink and uplink. This is a beacon-less scheme which involves each network device listening to the radio channel for a short time with the same constant period. If a network device detects activity it continues to listen until a data frame is received or until the channel becomes idle again. Meanwhile, the sender adds a wake up preamble in front of every data frame, to ensure that the receiver will be awake when the data portion of the frame arrives.

Figure 4:
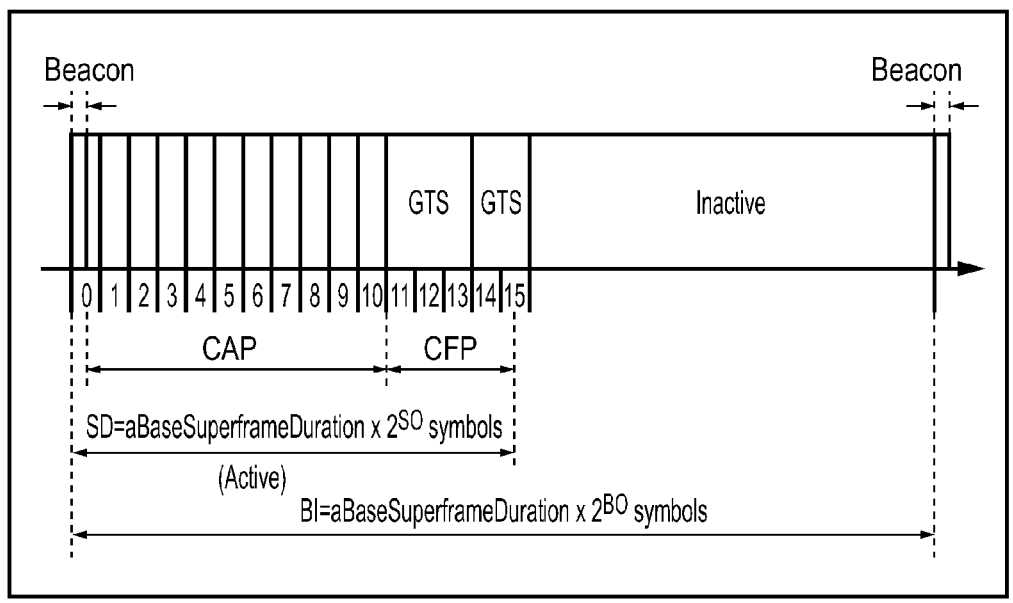
FIG. 4 shows the structure of a superframe in a beacon-enabled IEEE 802.15.4 WPAN.
Figure 4A:
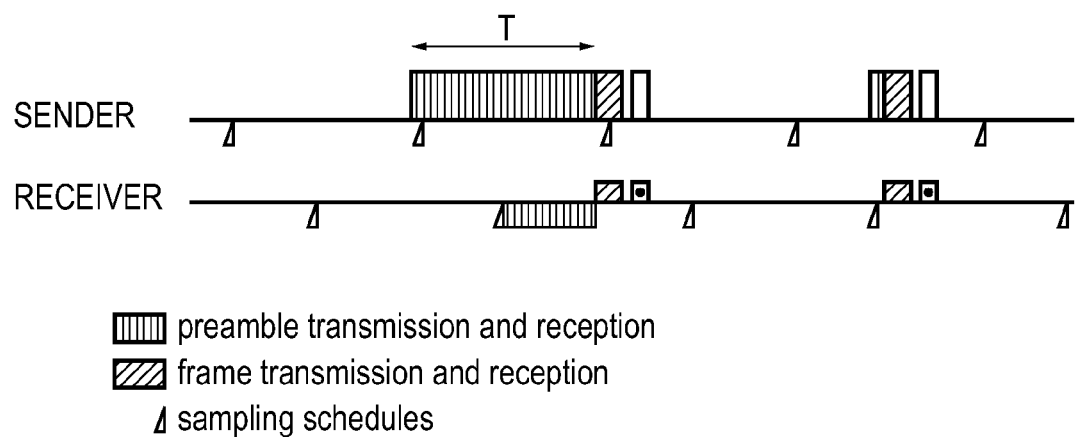
FIG. 4a shows a block signal diagram illustrating the WiseMAC channel access scheme.

WiseMAC protocol is based on CSMA with duty cycling, and using synchronised Preamble Sampling as explained in FIG. 4a. It is essentially an asynchronous CSMA-type scheme with specific provision for learning the schedules of neighbouring modes. It is assumed that WiseMAC uses only one channel for both control and data. Each node samples the channel periodically (Tw) to check for channel activities. i.e. each network device (node) wakes up periodically for a period of time. A sender with data to be transmitted sends a Preamble before the data to inform the receiver of upcoming data. The preamble should be long enough to coincide with the sampling time of a receiver. A receiver wakes up at its regular sampling time/wake up time. If the channel is free of activity it goes back to sleep. Otherwise, the receiver stays awake until it receives the data. After reception of the data, the receiver sends an acknowledgement ACK including the remaining time until its wake up time. Thus, after the reception of the ACK, sender is aware of the next wake up time of the receiver. Then the sender goes back to sleep. In the next cycle the sender can use a much shorter preamble, because it is aware of the receiver's wake-up schedule. The medium reservation preamble in WiseMAC is generated randomly by each node for data packet with a short preamble to avoid collision of node transmissions.

FIG. 4A shows the first longer wake-up preamble, data transmission and acknowledgement followed in the next receiver cycle with a shorter preamble, data transfer and acknowledgement. WiseMAC is a low power access scheme, but has the disadvantage of low throughput with respect to CSMA-CA as used in IEEE802.15.4.

To increase the throughput and the availability of channel access in certain circumstances such as emergency or perhaps streaming, nodes could switch to the CSMA mode of IEEE802.15.4. A variation of WiseMAC, known as WiseMAC HA has been proposed recently to increase the throughput and availability of channel access where some nodes can switch to the CSMA mode of IEEE802.15.4. However there has been no discussion on any potential switching criteria or necessary signaling for such switching, and so it is not clear if the affected nodes are permanently or temporarily in CSMA mode. In WiseMAC HA, a star topology is adopted, in which a central node (coordinator/sink) is in charge of collecting the sensory data (or data from other network devices). The sink is assumed to have more battery power and therefore can afford to be on or to follow some aggressive wake up pattern than the sensors with limited battery capacity.

In IEEE 802.15.4, as discussed below, both beacon-enabled and beacon-less topologies are provided for. The beacon-enabled topology uses a combination of protocols, with the concept of the "frame" replace by a "superframe" containing slots for both contention-based access via CSMA-CA, and guaranteed time slots (GTSs) allocated on a TDMA basis for exclusive use of a network device. Whilst this provides for reliable transmission of data by allocation of the GTSs, there is the drawback that the network devices have to remain powered-up ("awake") to listen to the coordinator for timing and slot allocation information. There is however a power saving advantage in TDMA, because a device can sleep during other devices' transmission slots.

To summarise, whilst beacon-based communication protocols providing a timing reference and (super-)frame structure allow fewer collisions and thus more reliable communication, this is at the expense of power consumption of the network devices. With beacon-less schemes, on the other hand, although the power consumption can be kept very low during inactive periods, the throughput is less guaranteed and the latency time (delay until obtaining channel access) is higher compared with beacon-based schemes.

The present invention proposes a channel access scheme switch suitable for IEEE802.15.6 which allows a low power consumption of network devices but gives a high reliability when necessary. Before explaining how this works, some more information about the general configuration of an IEEE 802.15.4 network will now be given, as similar configuration is expected to be used for IEEE 802.15.6.

Figure 2:
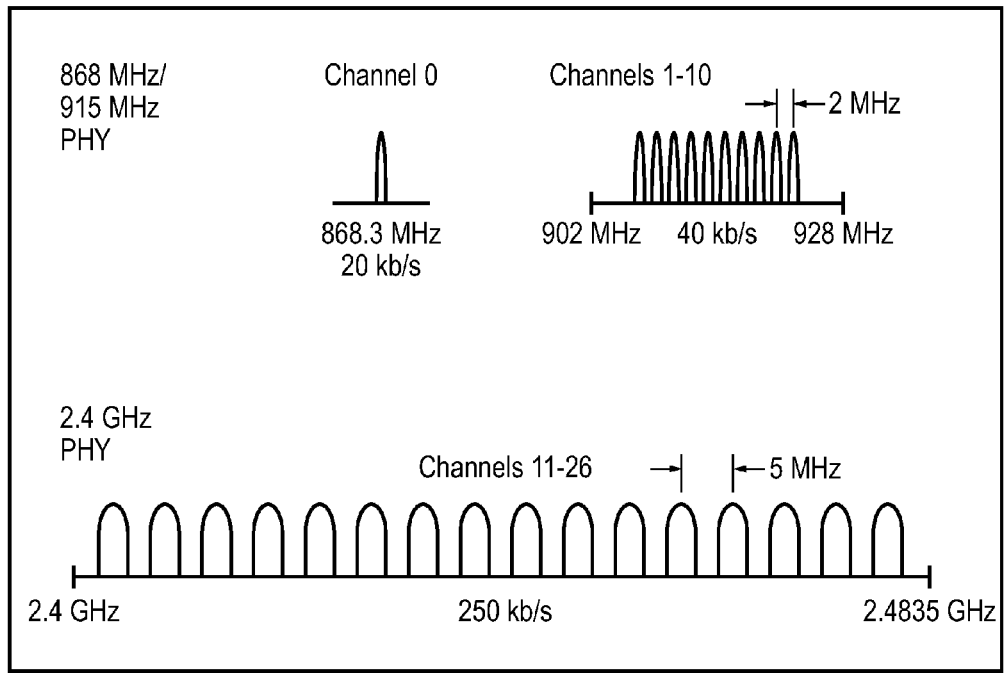
FIG. 2 illustrates possible PHY bands of the IEEE 802.15.4 WPAN.

FIG. 1 shows the general architecture of an IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
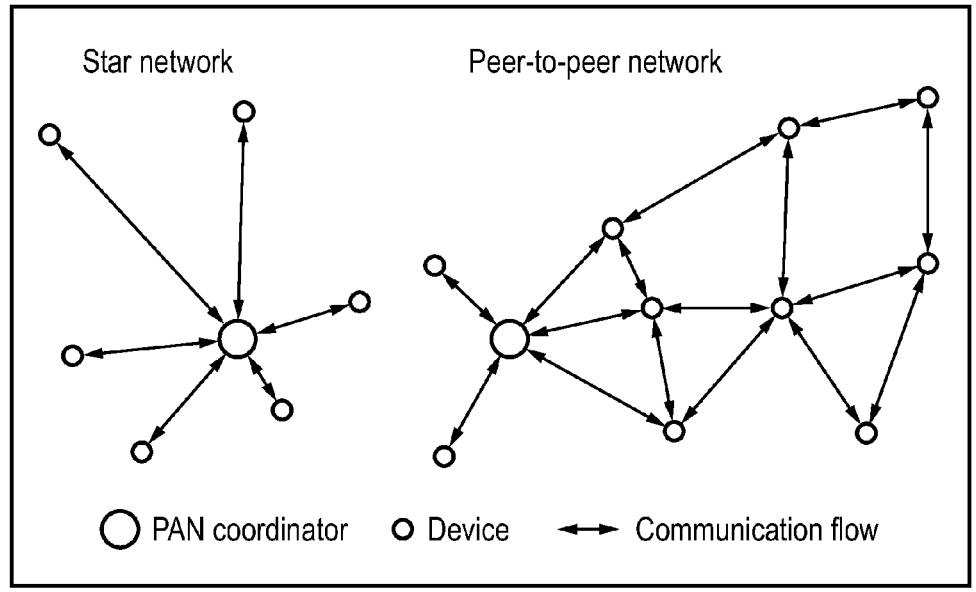
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central coordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. The topology may be dynamic, changing as devices are added or leave the network.

In the case of industrial WSNs, for example, a star network might be appropriate to monitor readings from sensor on a single stationary item of machinery with moving parts. A peer-to-peer topology, on the other hand, could be used to monitor objects on a conveyer belt.

In the case of MBANs, for example, a star network would be appropriate in the case where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network.

Multiple star and/or peer-to-peer networks may be set up in the same location such as a hospital or factory, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs and other WPANs in which sensors may be implanted within a body or device and thus unable to have a large or rechargeable battery.

Two types of WPAN envisaged in IEEE 802.15.4 are beacon-enabled and non beacon-enabled.

In a beacon enabled network, the coordinator transmits a beacon periodically and devices listen periodically to that beacon to synchronize to the network and to access the channel. The channel access follows a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. First comes a slot 31 for a beacon frame (see below) transmitted by the coordinator. After this, several slots 32 are provided within the CAP, allowing data transmission to or from devices on a contended basis, following the known CSMA-CA algorithm as mentioned above.

Next there follow the guaranteed time slots GTS 33 of the CFP, and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern (or duty cycle) according to a certain protocol such as sensor—MAC.

For an MBAN application, the coordinator is external to the body or bodies being monitored. It may be a PDA, a mobile phone, a bedside monitor station or even a sufficiently-capable sensor which on a temporary basis acts as a coordinator. In an industrial WSN, the coordinator may be a PDA, a sensor, a laptop or other computer, or even a central or regional processor. As mentioned above, the coordinator in the beacon enabled network is in charge of providing synchronization and channel access to network devices. The start and end of a superframe is also defined by a coordinator. The coordinator has two main features of potential communications to other networks and access to a sufficient power supply, for example by easy replacement of the charged batteries.

FIGS. 5 to 8 illustrate data transfers between a device and a coordinator in an IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
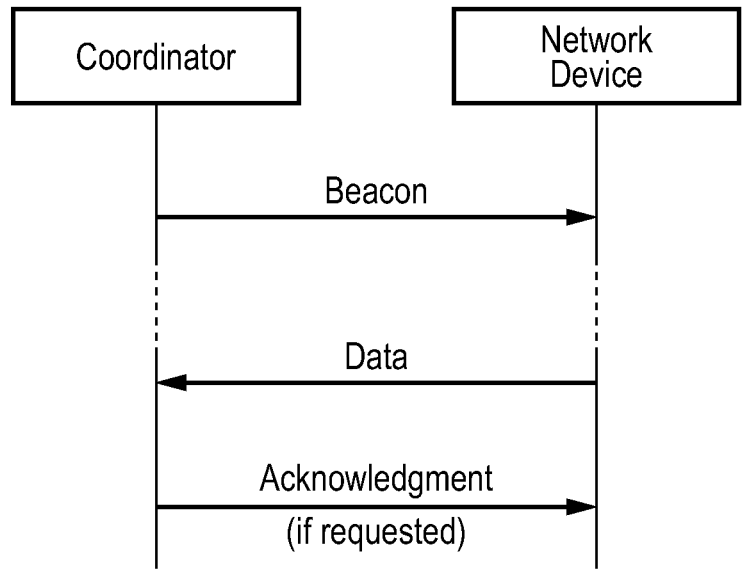
FIGS. 5 to 8 illustrate possible modes of data transfer between a network device and a coordinator in an IEEE 802.15.4 WPAN.
Figure 6:
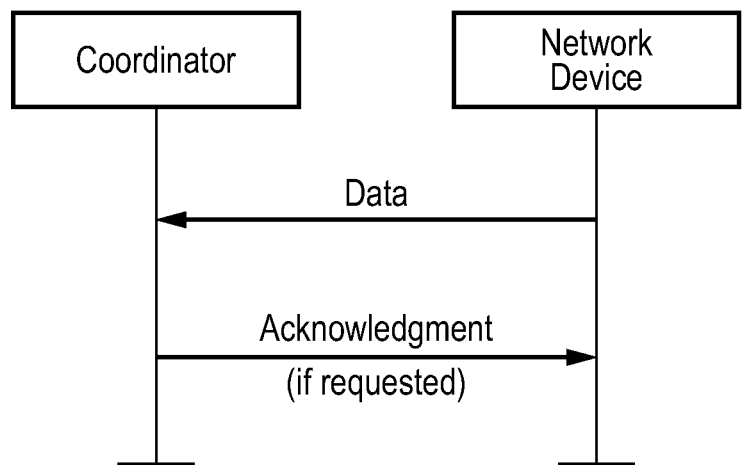

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator optionally acknowledges the successful reception of the data by transmitting an acknowledgment frame 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
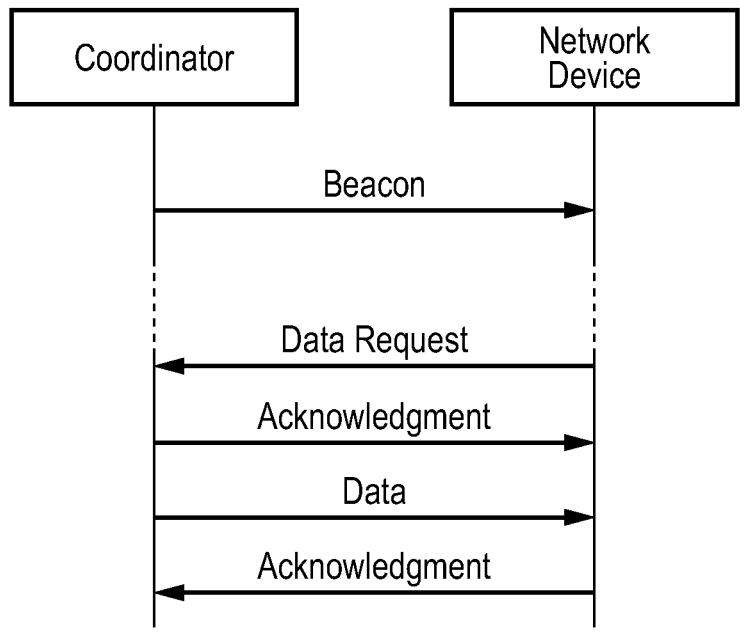
Figure 8:
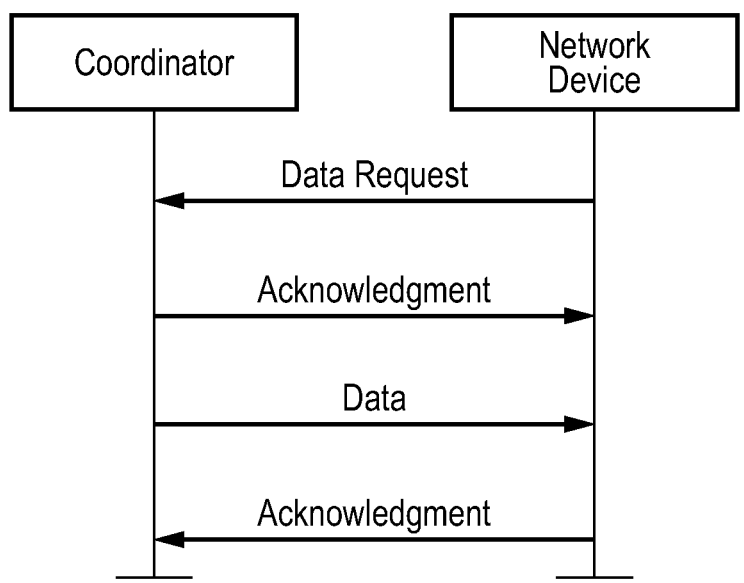

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in an IEEE 802.15.4 network involve frames of four different types:
beacon frame 41, used by a coordinator to transmit beacons
data frame 42, used for all transfers of data
acknowledgment frame 43, used for confirming successful frame reception
MAC command frame 44, used for handling all MAC peer entity control transfers such as data requests.

Figures 9, 10, 11:
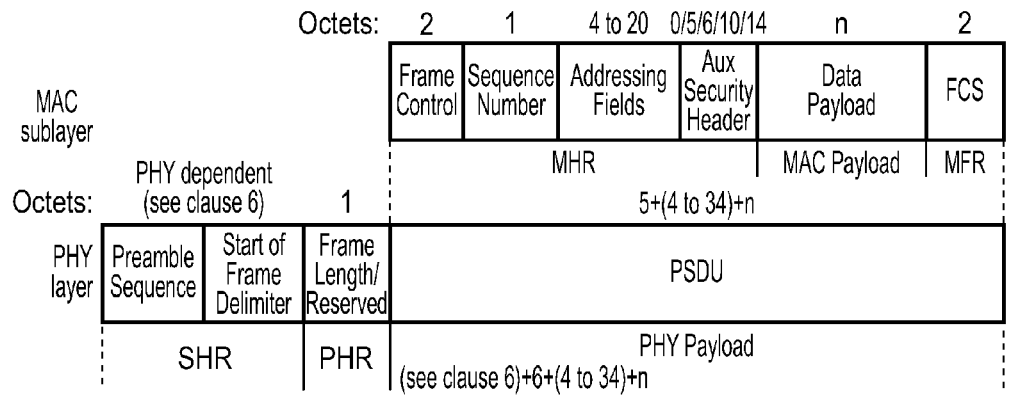
FIG. 9 shows a frame format used for a data frame in an IEEE 802.15.4 WPAN.
FIG. 10 shows the structure of a Frame Control field in the frame format of FIG. 9.
FIG. 11 is a table of possible values of frame type bits in the Frame Control field of FIG. 10.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 11. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 11 is a table of the possible bit values for the Frame Type subfield 51, showing that values 100 and 101 are unused in the IEEE 802.15.4 specification.

Figure 12:
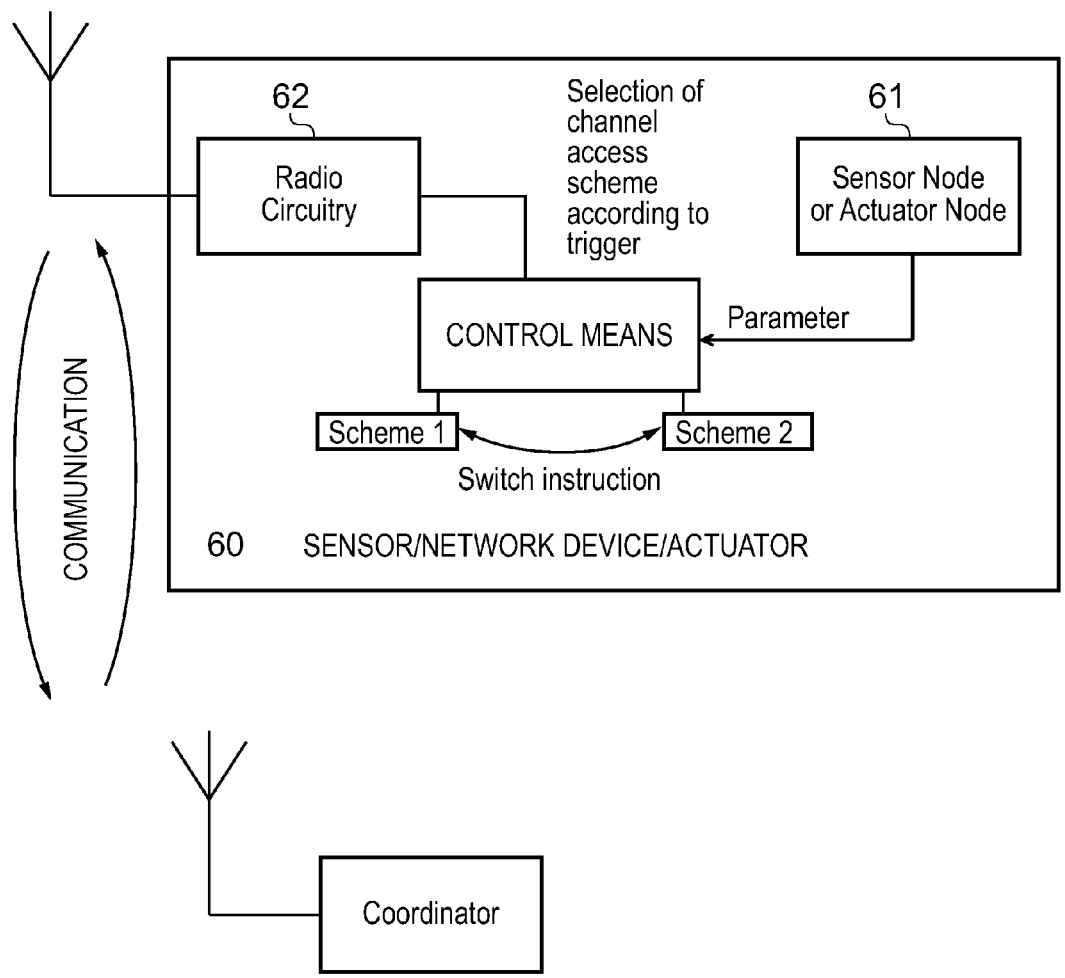
FIG. 12 is a schematic diagram showing a wireless sensor, and coordinator in a WSN according to embodiments of the present invention.

Having outlined the background of the present invention, reference is now made to embodiments of the invention. FIG. 12 is a schematic diagram representing a network device in the form of a sensor 60 which measures a parameter using sensor node 61 and transmits it to another device using radio circuitry 62.

The sensor is shown with its transmission/reception means controlled by radio circuitry 62. The sensor control means 63 act to select a channel access scheme according to a trigger. There is two-way communication with coordinator 64 and the skilled reader will appreciate that this can be direct (via other devices) or indirect. As set out above, the trigger for the sensor to switch from a lower throughput channel access scheme to a higher throughput scheme may be created in the coordinator, in the sensor, or even externally of the network, for example in a central monitoring unit. If the trigger is created in the sensor it will be transmitted to the coordinator. If the trigger is not created in the sensor it will be transmitted to the sensor. The trigger activates a switch instruction to switch from one scheme to the other. The switch instruction can be transmitted to or from the sensor or may even be an internal switch within the sensor.

Looking at the preferred embodiments in more detail, starting from the WiseMAC scheme, the sink/coordinator can trigger the switch to CSMA stage on demand when it is required, such as in an emergency situation. After the switch, the coordinator can send a switch instruction to the sensors about the current mode of operation (CSMA) through the ACK mechanism.

Figure 13:
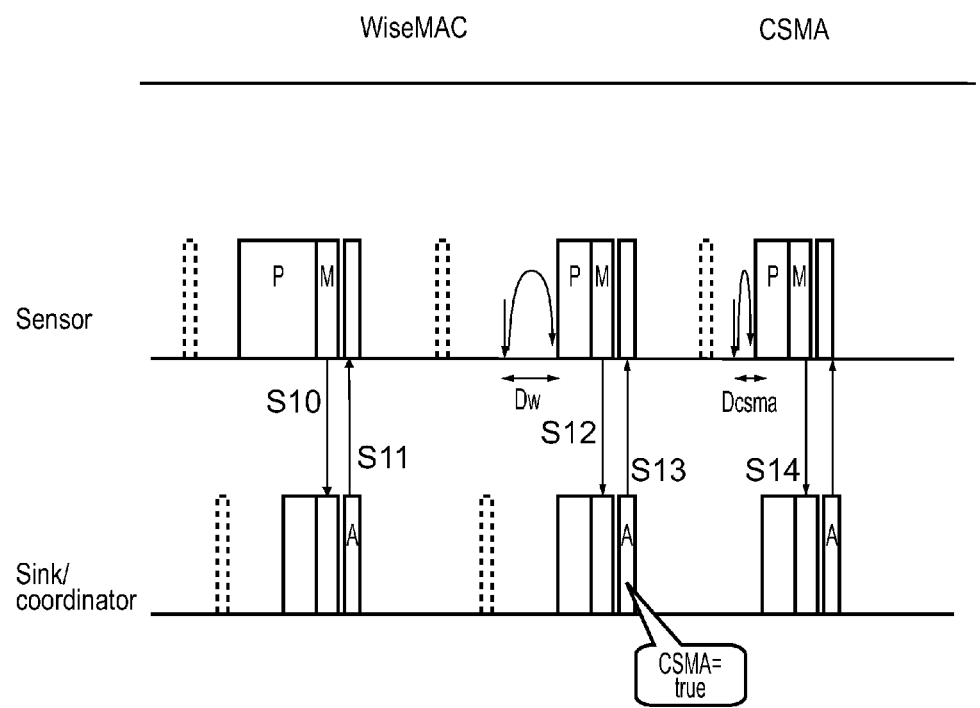
FIG. 13 shows a block signal diagram illustrating a switch between WiseMAC and CSMA.

FIG. 13 illustrates some suitable steps to perform the switching between WiseMAC and CSMA modes; as an example:

S10 The sensor sends data to the sink following WiseMAC protocol.

S11 In the first wake up time, the ACK contains information on the next wake up time of the sink.

S12 In the second wake up time, and upon arrival of data the sensor waits until around the wake up time of the sink (Dw) and then sends the preamble and data and waits for the reception of ACK from the sink.

S13 The sensor receives ACK from the sink with the switch instruction as to the mode of operation of sink, which is now CSMA.

S14 Now the sensor is aware that the sink has changed the sensor's mode of operation. Upon the next arrival of data on the sensor node, the sensor does not wait for the next wake-up time for the sink. Instead it contends for the channel and therefore waits for a contention window equal to Dcsma to transmit its data.

The following pages set out a number of scenarios illustrating different circumstances under which the switch between channel access schemes is carried out, showing different degrees of centralisation and different triggers. All of the examples refer to switches between WiseMAC and CSMA, but the mechanisms are equally appropriate for switches between other channel access modes, the first of which has a lower throughput than the second, and also refer to switches back from the higher to the lower throughput mode.

Some of the scenarios considered are partially distributed, meaning that the trigger to switch between modes is initiated by the sensor and sent to the coordinator. However, the decision to switch between modes is decided by the coordinator. In a partially centralised scenario the trigger to switch between modes is initiated by the coordinator and sent to sensor. However, the decision to switch between operation modes is decided by the sensor. In a more centralised scenario, at least one trigger (or trigger factor) and switching are both initiated by coordinator. Following an autonomous scenario, both the trigger and the switching could be initiated by the sensor.

The sequence of events for switching between WiseMAC and CSMA operation modes could be any one of the following.

Trigger 1 is a partly distributed scenario, with a 'more data' trigger as indication of increased traffic. This situation occurs when a sender node has more than one packet in its queue. The "more bit" trigger is an indication of increased traffic (transmission required) such as high load or streaming and therefore can be indicated in the 'more bit' of the transmitted packet signals to the destination or coordinator. The destination then signals to the sender (and any overhearer) the switch to CSMA mode in the ACK. The sender can then switch to CSMA for further transmission. If any overhearers receive the trigger in the ACK they can contend for the channel with the sender.

Figure 14A:
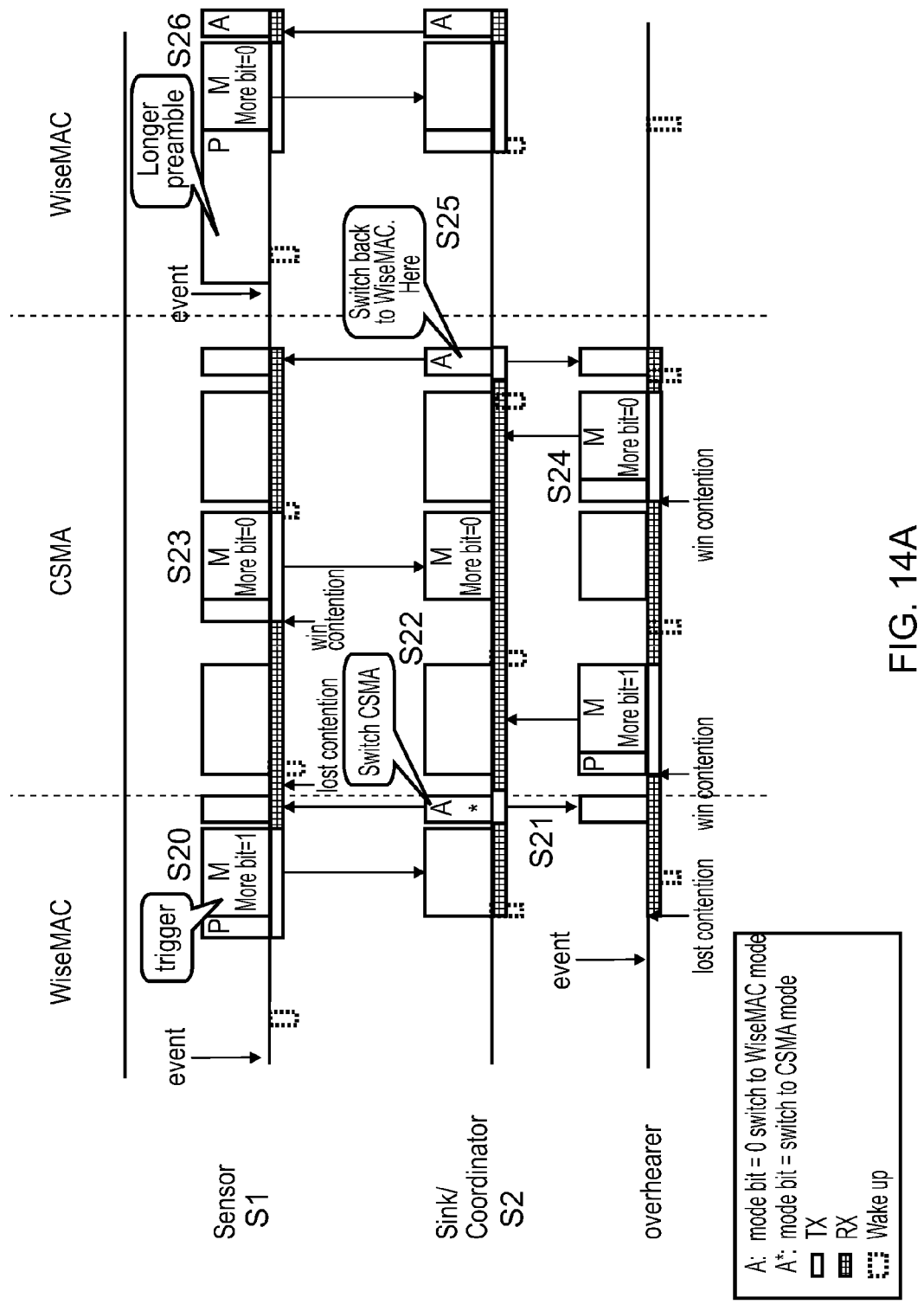
FIG. 14A shows a block signal diagram illustrating switches between WiseMAC and CSMA in a partly distributed scenario with a 'more bit' trigger.
Figure 14B:
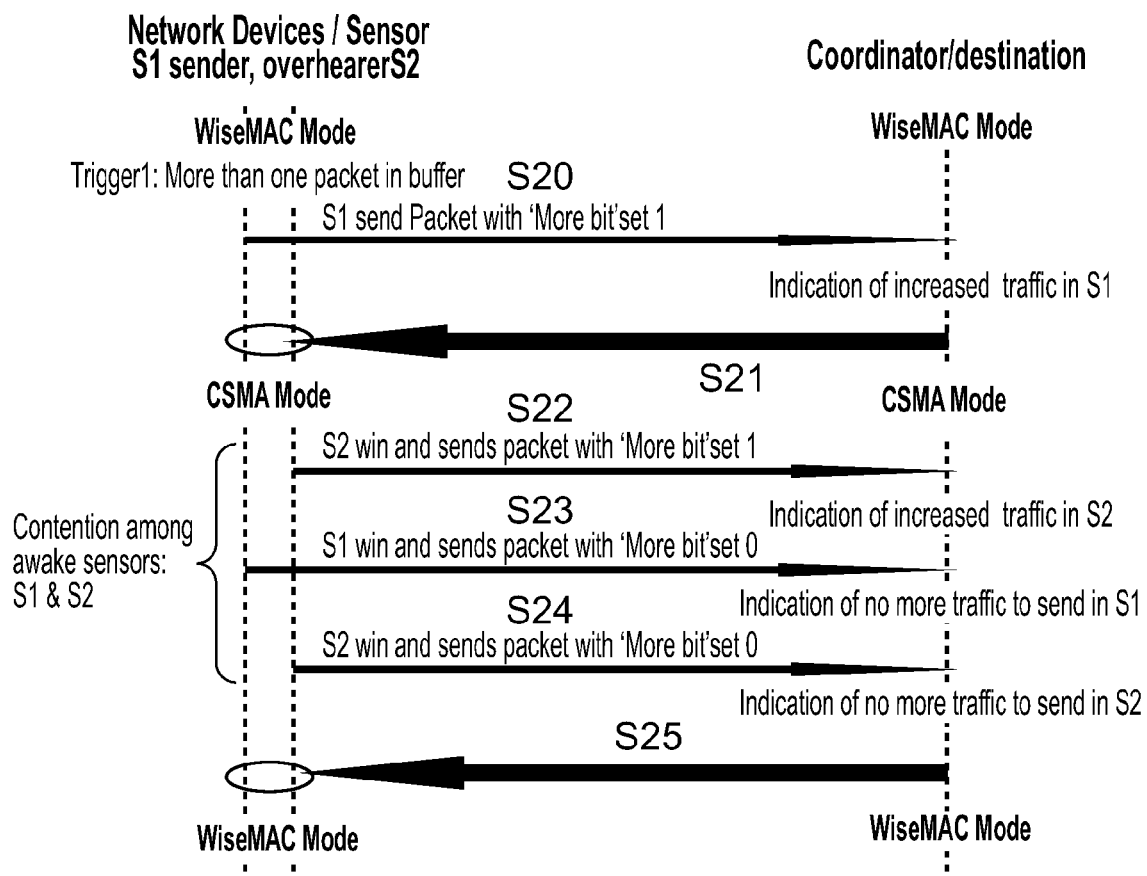
FIG. 14B is a signal flow depiction based on the signalling in FIG. 14A.

FIG. 14A and FIG. 14B show the sequence of events when the sender triggers the switch to CSMA for increased throughput and decreased latency.

In WiseMAC, the sender with "more bit" indication in the packet sends the second packet after it receives the ACK from the receiver. However if we switch to CSMA, the sender and any overhearers contend for the channel using CSMA protocol. It is important to note that although the "more bit" increases the throughput it can decrease fairness as some nodes may be completely prevented from accessing the channel, usually because they use CSMA and thus can lose the contention. If other sending nodes are still using WiseMAC, they also may be prevented from receiving the ACK, for example if they are sending more data (using the "more bit" indicator) and therefore still holding the channel.

In this scenario, there is the issue that the sender in CSMA (or the coordinator) cannot receive ACK therefore they will not be informed on when to do the switch back to WiseMAC. That is, any device (whether a sensor, coordinator or other device) that is sending when the ACK is transmitted (which can happen in an asynchronous system) cannot receive the ACK. One possible solution is to piggy back the switch on packets or broadcast the change.

Looking at FIGS. 14A and 14B in more detail, in step 20 the sensor sends data and an indicator that more data is to follow using a bit set to one, for example a frame pending bit as in IEEE802.15.4. In step S21, the coordinator sends an acknowledgement to the sensor which includes indication of a switch to CSMA, for example as a bit set to one in a control or command field of an acknowledgement of frame. In step S22 the overhearer S2 wins the contention and sends a packet with an indication that more data is to follow. Thus overhearer S2 also transmits a trigger to the coordinator. In step S23 the original sender S1 wins the contention and sends packet indicating that there is no more data to be transmitted. This deactivates the S1 trigger. Subsequently in step S24, overhearer S2 wins the contention and sends a packet with an indication that there is no more data to be sent and therefore that its trigger is also deactivated. Thus the requirement for CSMA mode no longer exists and the coordinator sends a switch back instruction to the sensor S1 and overhearer S2 in step 25. The sensors then return to a WiseMAC pattern as evidenced by the longer preamble sent as part of a new data transfer in step S26 as shown in FIG. 14A.

FIGS. 14A and 14B relate to a partly distributed scenario, with increased load in the sensor which triggers the switch to CSMA but in which the switch instruction is sent by the coordinator. In trigger 2, which is also related to the partly distributed scenario, an emergency is bit is sent from the sensor as the trigger and the coordinator transmits the switch instruction.

Figure 15A:
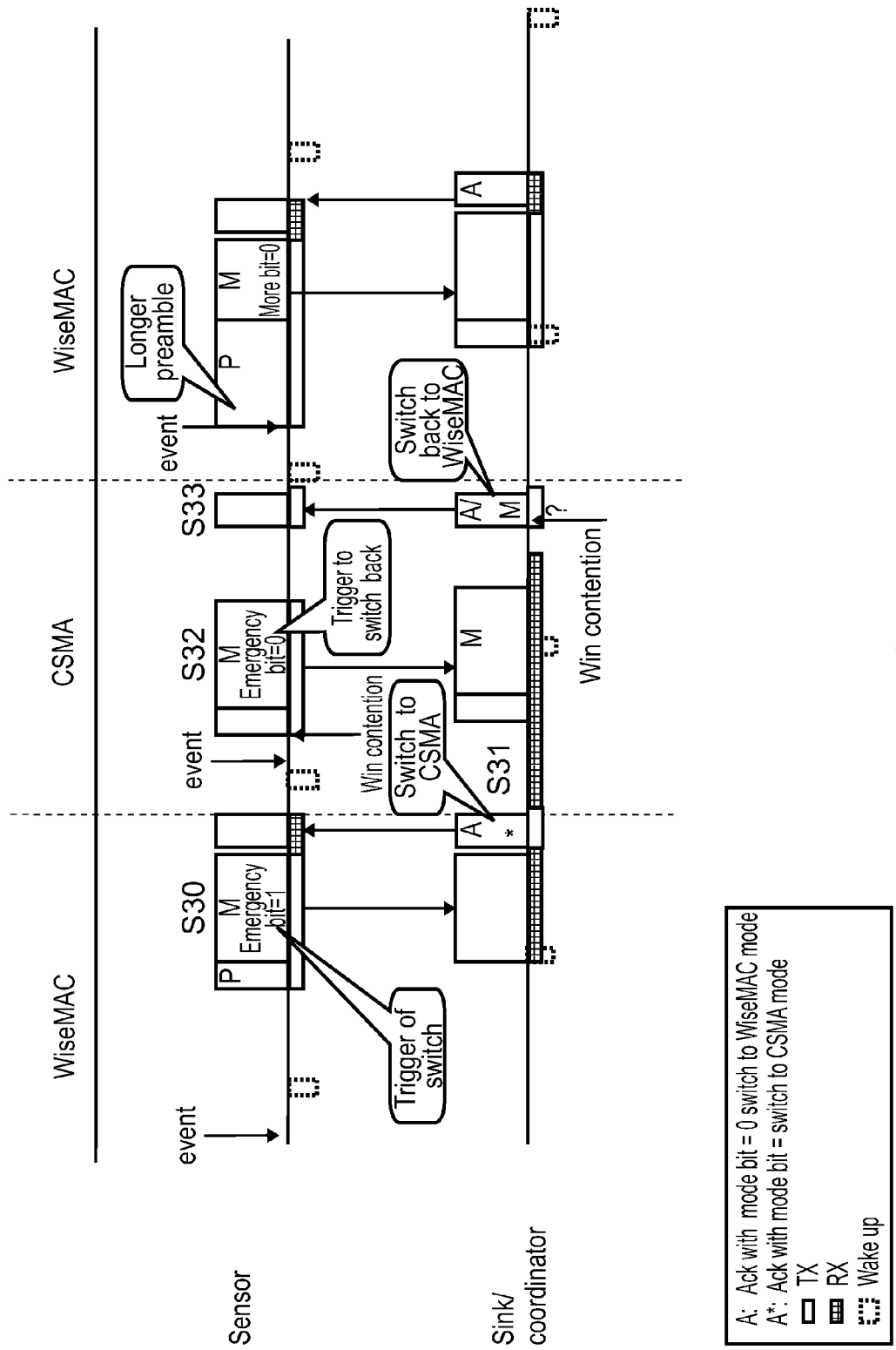
FIG. 15A shows a block signal diagram illustrating switches between WiseMAC and CSMA in a partly distributed scenario with an 'emergency bit' trigger.
Figure 15B:
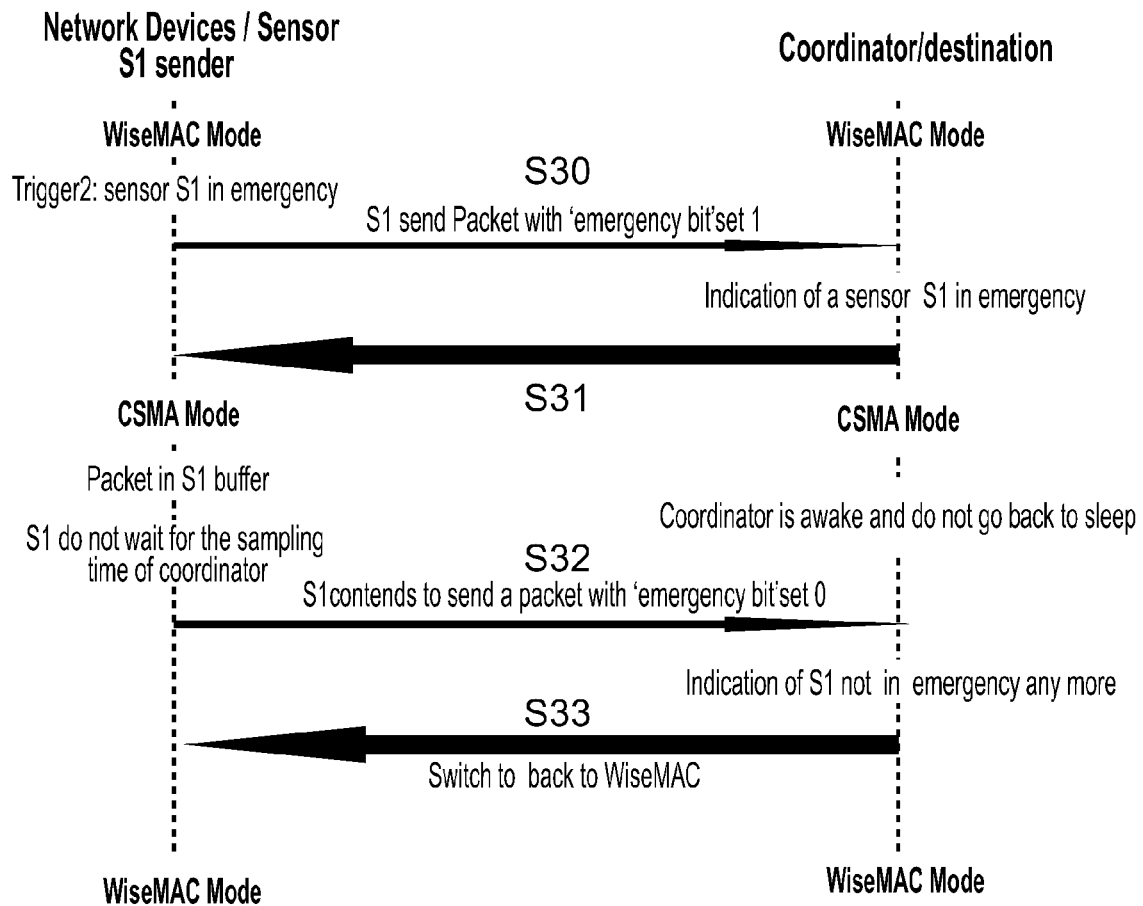
FIG. 15B is a signal flow depiction based on the signalling in FIG. 15A.
Figure 16A:
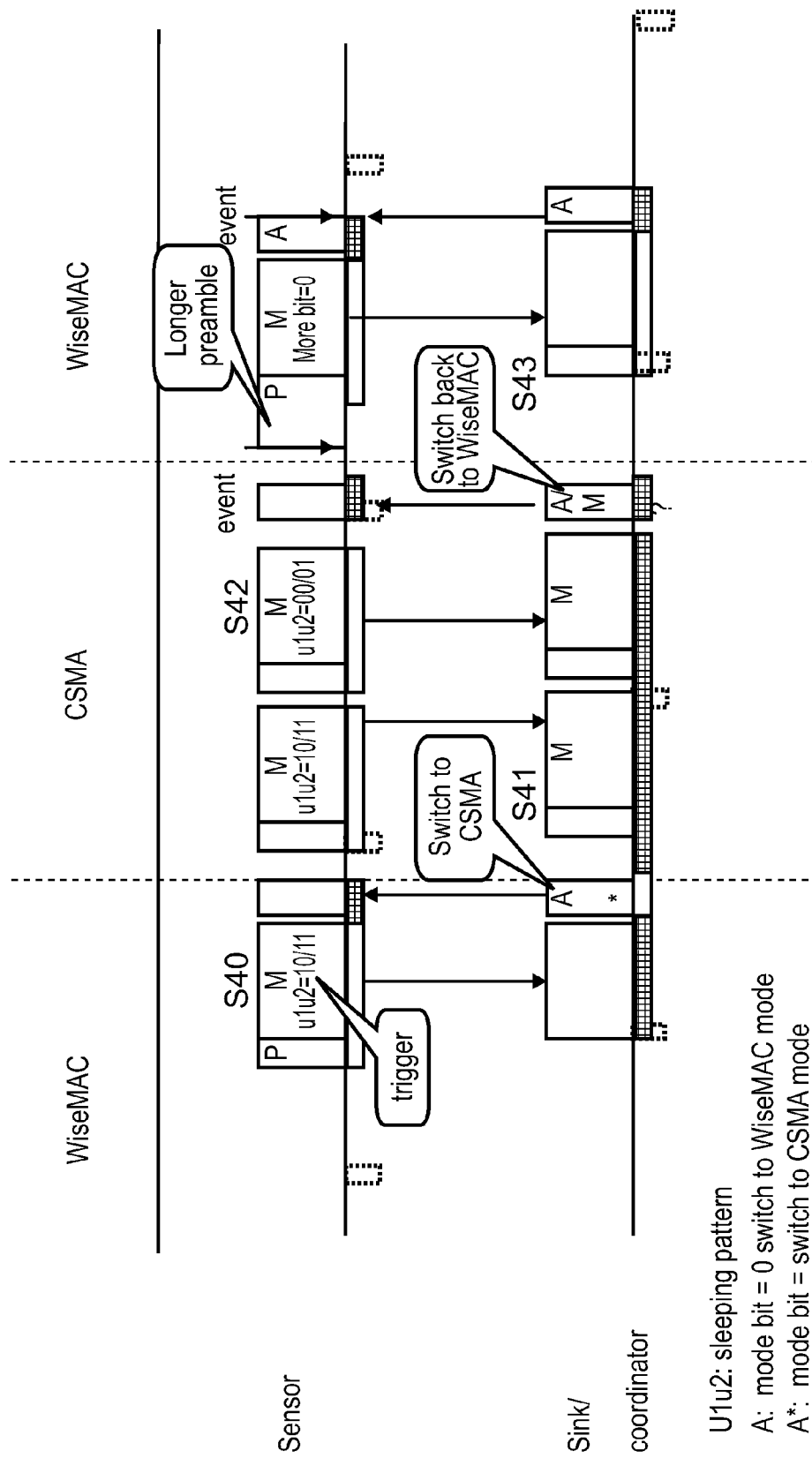
FIG. 16A shows a block signal diagram illustrating switches between WiseMAC and CSMA in a partly distributed scenario with an 'urgency bit' trigger.
Figure 16B:
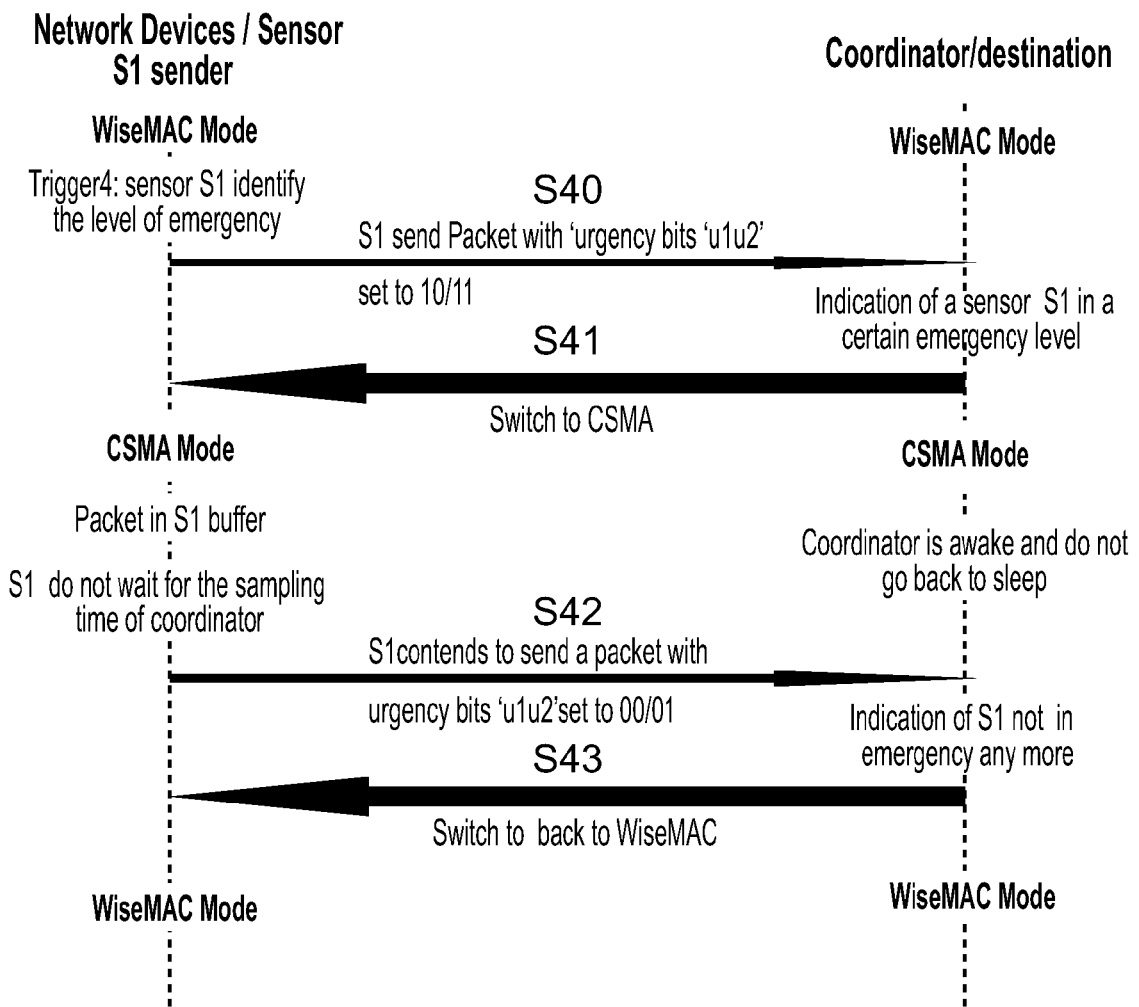
FIG. 16B is a signal flow depiction based on the signalling in FIG. 16A.

FIGS. 15A and 15B illustrate this scenario. The sensor analyses data collected and recognises it is in an emergency situation for example using thresholding. In step S30 the sensor sends a message to coordinator to inform it about the situation by setting the emergency bit to 1 to indicate an emergency. In step S31, the coordinator sends a message to switch the mode of operation to CSMA to handle the emergency situation. Later, in step S32 after switching to CSMA, the sensor is no longer in emergency, and the emergency bit is set to 0. Thus a switch instruction back to WiseMAC is sent in S33, that informs the sensor to switch back its mode of operation to WiseMAC.

Trigger 3 again demonstrates a partly distributed scenario with a trigger sent from the sensor but the switch to the higher throughput channel access scheme decided in the coordinator. Trigger 3 uses urgency bits as a trigger for a switch to CSMA. The skilled reader will appreciate that a given network may use urgency bits in addition to or instead of the emergency bit previously mentioned.

In step S40 the sensor analyses data collected and recognises that it is in an emergency situation, sending a message to coordinator to inform it about the situation by setting the bits u1 & u2 appropriately according to the level of emergency. These bits can correspond to sleep patterns as set out in Table 1 below.

Table 1 below gives an example of different suitable predefined sleep patterns based on different urgency levels of devices in a WSN. For example, in a network for medical use such as an MBAN, a low duty cycle sleep pattern can be used for non-medical devices (for example for a doctor's PDA, a watch or a mobile phone of the patient which are connected into the WSN). As can be seen from Table 1, such non-medical devices thus have the longest sleep time or percentage sleep time. An indication of this sleep pattern can be sent over the WSN, for example as urgency bits in a frame control field of a transmission frame. In this example, a non-medical device is shown to have urgency bits 00. Table 1 shows a medical device in a normal condition having a normal medical pattern sleep with a slightly higher duty cycle and denoted by urgency bits 01. With a slightly abnormal condition in such a medical device the duty cycle is again increased slightly and the urgency bits are 10. Finally, for a medical device in an emergency situation there is a dramatic increase in the duty cycle or a continuous wake up. Urgency bits 11 are used to denote this emergency condition. In this example for a medical sensor device the transition between the normal and slightly abnormal situation and between the slightly abnormal and emergency situation can be triggered by the measured parameters crossing each threshold in each case. As a skilled reader will appreciate, the increased urgency may be down to the parameter either falling or rising or both, if the parameter has an acceptable range of values, with increasingly unacceptable values to either side of the acceptable range defined by a number of thresholds.

TABLE 1 sleep patterns and urgent bits with a mixed network of medical and non-medical devices.

| Urgency bits | Urgency level | Sleep pattern | Channel access |
|---|---|---|---|
| 00 | Non-Medical Device | Longest Sleep Time | WiseMAC |
| 01 | Medical Device with normal Situation | Normal Medical Pattern Sleep | WiseMAC |
| 10 | Medical Device in Slightly Abnormal conditions | Increase slightly duty | WiseMAC |
| 11 | Medical Device in Emergency Situation | Increase dramatically or continuous wake up | CSMA |

Also, as briefly set out above, in some embodiments the change in sleep pattern can be triggered by a change in parameter values over time or in a rate of change of parameter values over the time or any other suitable criteria. For example, a very rapid change in pulse rate may be due to a pathological arrhythmia, rather than physiological conditions and therefore suitable for triggering a changed sleep pattern taking a rate of change into account.

The bit values in Table 1 are fixed for all devices and their interpretation is known to the sensor, the coordinator or controller and to any central monitoring unit, which may be provided as part of the BAN, or separately.

In step S41, the coordinator sends a message to switch the mode of operation to CSMA to handle emergency situations. Later, after switching to CSMA, when sensor is not in emergency anymore, the coordinator informs the trigger is deactivated in step S42, and the sensor is instructed in step S43 to switch back its mode of operation to WiseMAC.

The next trigger is another partly distributed scenario in which the sender recognises the criticality of the situation and sends the trigger using urgent bits U1 and U2 and battery bits B1 and B2. The coordinator can activate the switch instruction based on the trigger, which thus takes battery status into consideration.

The previous examples have only taken a single factor trigger into account. Trigger 4 on the other hand has a combined trigger with two factors; urgency (which is derived at as before in function of a sensor parameter); and battery level.

The skilled reader will appreciate that other combined factor triggers can be created, for example combining the emergency bit with the battery level or the more bit with the battery level.

FIG. 17 is a Table demonstrating an example of battery bits that can be used in a frame control field, frame header or MAC command payload of a transmission frame to denote battery charge level.

The percentage charge is divided into four different levels each with a range of 25%. Alternatively fewer or more levels may be chosen and the scale need not be divided linearly. For example, the top charge level may be of 50 to 100% for example and other charge levels may cover a smaller range. As for the urgency bits, two bits are used, allowing division of the battery charge into four different levels.

In such cases, the battery level can be included in the trigger to make sure that the higher throughput access scheme does not lead to complete depletion of the battery charge. In these invention embodiments, the higher throughput scheme which is suitable given the parameter values measured can only be implemented if the battery level is appropriate. Otherwise, the current scheme is maintained. Equally, if the battery level falls, the lower throughput scheme may need to be selected.

In this scenario, emergency data is still recorded but at a slower pace than is ideal. This is particularly advantageous when the device is an implant, for example and the battery cannot be replaced immediately (because an operation is necessary to access the battery). It is also helpful for telemetry emergency applications when the nurse or medical assistants are not around during the night to change the batteries for non-implant applications. For example, in homecare it is advantageous to continue recording any rare medicals or emergency situations which may occur for a couple of minutes only during the night with a higher accuracy and sampling rate. At the same time, the sensor can send a message of low battery level to the coordinator.

FIG. 18 is a table 70 demonstrating one way of associating sleep patterns to levels of battery charge. Here the sleep patterns shown may be for a single category of device so that the division into medical and non-medical devices shown in the previous Figures and Table 1 is no longer applicable. The lowest level <1 (0 to 25%) only allows a low wake up sleep pattern whatever the outcome of the threshold comparison; the second level L2 additionally allows a medium wake up pattern; the third level L3 (50 to 75%) additionally allows a higher wake up pattern and the top level L4 (75 to 100%) additionally allows a continuous wake up pattern so that all the possible sleep patterns are permitted. Thus the battery charge level overrides a sleep pattern selected according to parameter values if necessary. There is a one-to-one correspondence between the limits between the levels L1 to L4 and the thresholds defined for the parameters, for reasons of practicality, so that each limit crossed between two levels moves the boundary for acceptable sleep patterns by one predefined sleep pattern.

Table 2 shown below considers one category of device and associates urgent bits with sleep patterns and channel access modes. The right hand column shows a possible link between the sleep pattern and the channel access mode, but other associates are possible.

| Urgent bits: u1u2 | Urgency level | Upper threshold | Sleep/wake up pattern | Channel access mode |
|---|---|---|---|---|
| 00 | Device in Normal Condition | Th1 | Normal sleep/wake up pattern; Longest Sleep Time, very low duty cycle | WiseMAC |

| Urgent bits: u1u2 | Urgency level | Upper threshold | Sleep/wake up pattern | Channel access mode |
|---|---|---|---|---|
| 01 | Device in Slightly Abnormal condition | Th2 | Slightly Abnormal Sleep/wake up Pattern; Slight increase of duty cycle | WiseMAC |
| 10 | Device in Abnormal condition | Th3 | Abnormal Sleep/wake up Pattern; increase of duty cycle | WiseMAC/ CSMA |
| 11 | Device in Emergency | | Emergency Sleep/wake up Pattern; dramatic increase of duty or cycle or continuous wake up | CSMA |

In a normal condition the coordinator sends urgency bits 00 (with parameter values up to threshold Th1). With a slight abnormality, urgency bits 01 (from Th1 up to threshold Th2 of the measured parameter) are sent. In abnormal conditions up to threshold Th3 of the measured parameter the device sends urgency bits 10. From measured parameter values of Th3 upwards, the device is in emergency and sends urgency bits 11.

The urgency bits and battery levels transmitted may be used separately, with the battery bits purely indicating battery level and the urgency bits purely derived from the parameter level. In a more complex scheme, the urgency bits can represent a suitable sleep pattern taking the parameter measurement only into account and the battery bits can show the actual sleep pattern in operation, which is the maximum allowed sleep pattern also taking the battery level into consideration.

Figure 19A:
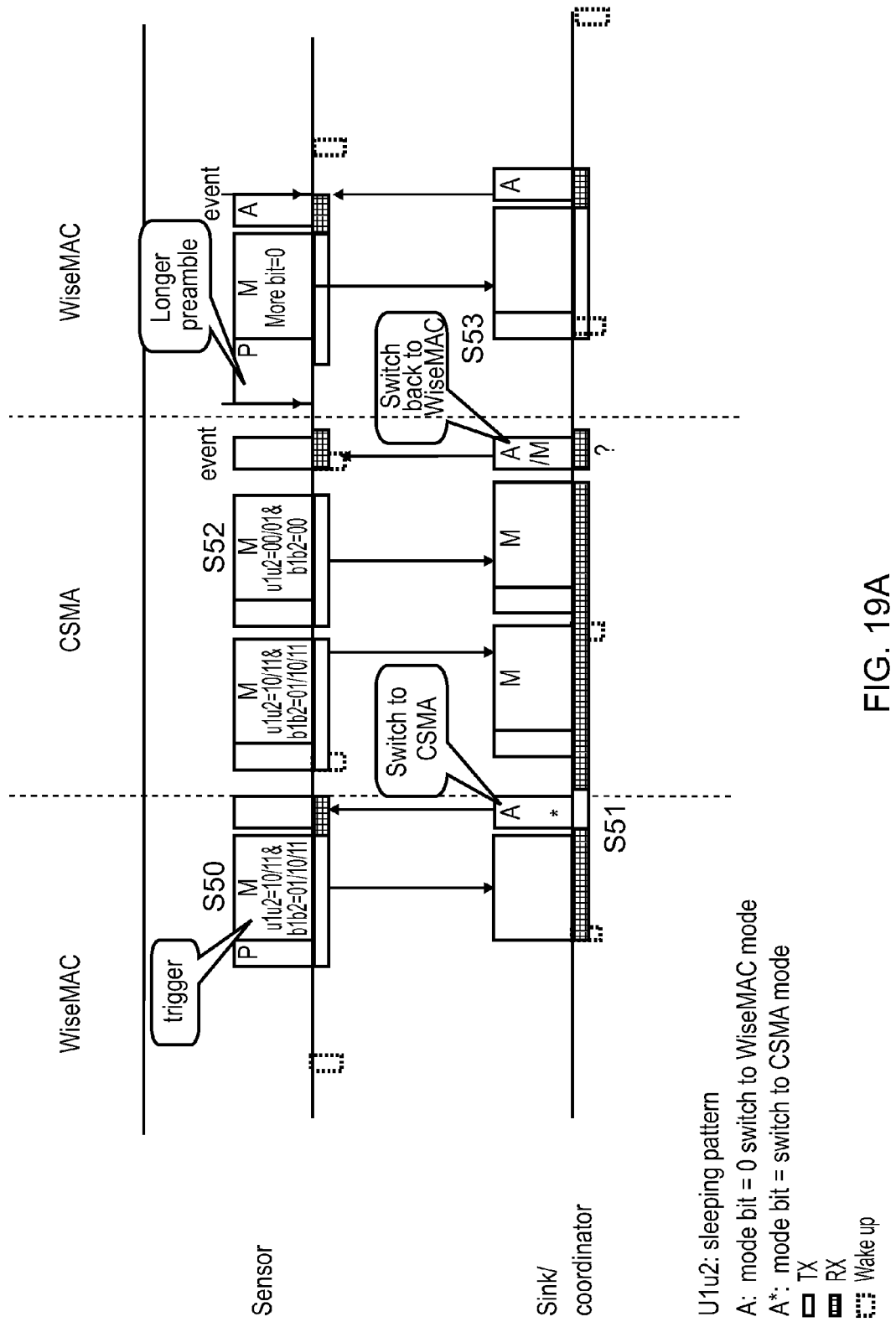
FIG. 19A shows a block signal diagram with a combined trigger of 'urgency bits' and 'battery bits'.
Figure 19B:
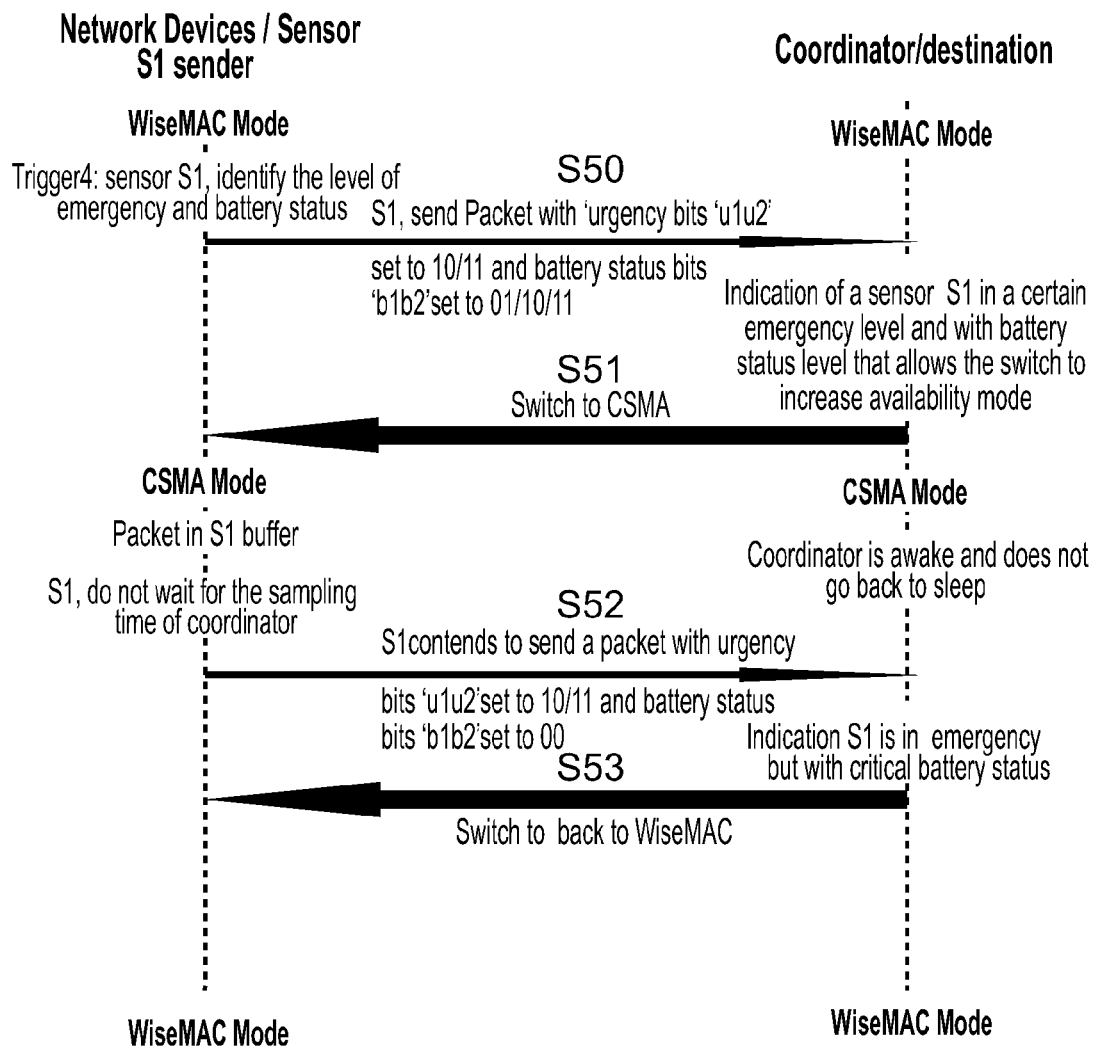
FIG. 19B is a signal flow depiction based on the signalling in FIG. 19A.

FIGS. 19A and 19B show signal diagrams illustrating trigger 4 in partly distributed scenario with a combined trigger of urgency bits and battery bits.

Initially, the sensor analyses the data collected and recognises it is in an emergency situation; the sensor also checks the battery status. Then, in step S50, the sensor sends a message to the coordinator to inform it about the situation, setting the urgency bits u1 & u2 appropriately according to the level of emergency and the battery b1&b2 bits according to battery status (which is ok in this case).

If the battery status is ok, the coordinator sends a message in step S51 to switch the mode of operation to CSMA to handle the emergency situations. If the battery is low on the other hand and the sensor is in an emergency situation, the coordinator does not enforce a change of mode of operation to CSMA on the sensor, it takes the necessary action to handle the emergency case and the low battery.

Later, after switching to CSMA, if the battery becomes low, and the sensor is still in emergency, the combined trigger is deactivated in step S52 and the coordinator informs the sensor to switch back its mode of operation to WiseMAC in step S53. It takes the necessary action to handle the emergency case and the low battery.

Figure 20:
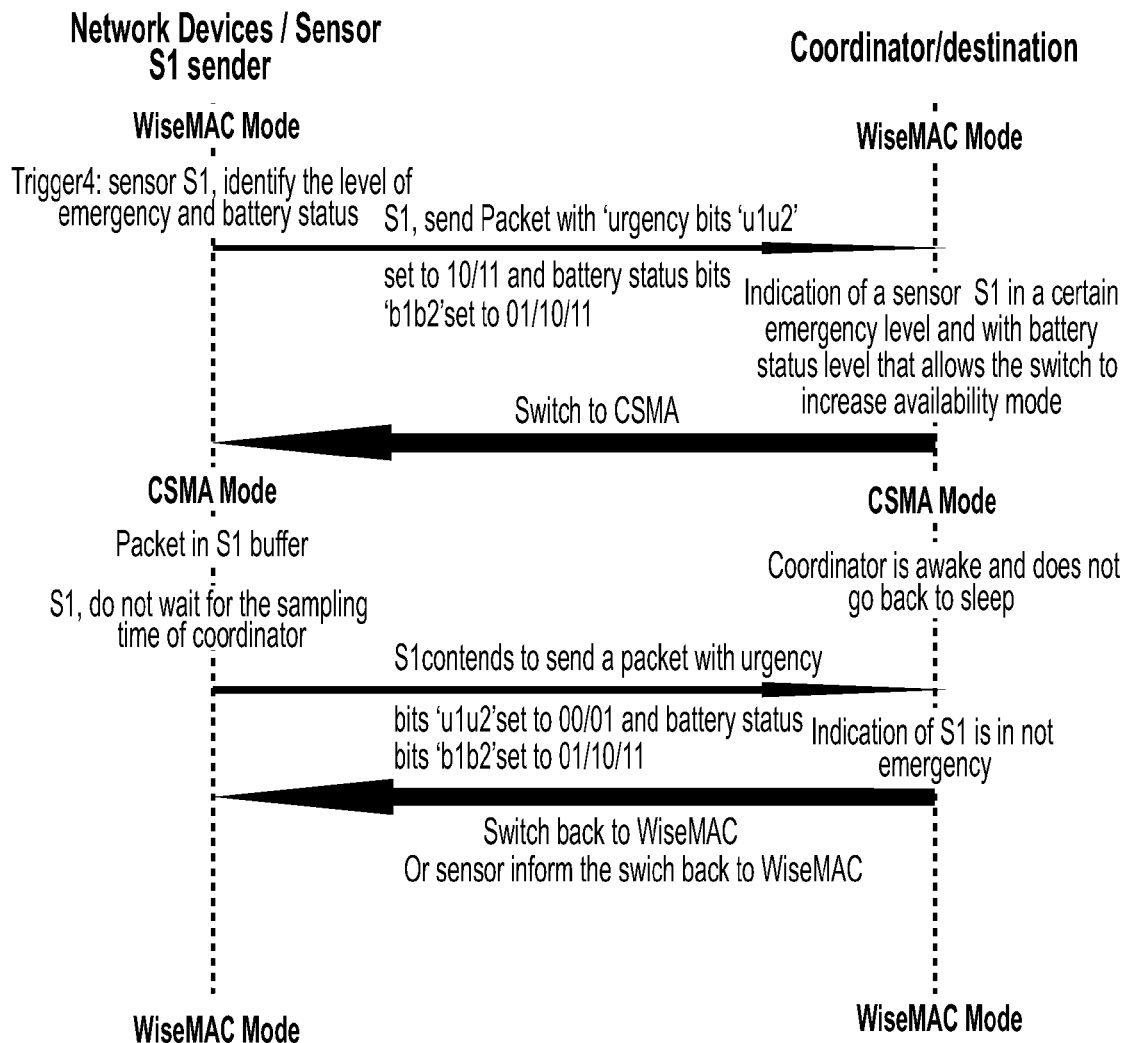
FIG. 20 is a signal flow diagram showing a switch back to WiseMAC when the urgency level has lowered and the battery level is still adequate.

In an alternative scenario rather than the battery becoming low, this factor thus deactivating the combined trigger, the urgency level becomes low and that factor then deactivates the combined trigger. The difference over FIG. 19B is shown in step S52 of FIG. 20.

In the preceding scenarios, the sensor has autonomously realised that it has increased transmission requirements for some reason and thus sent the trigger to the coordinator. In other embodiments, the coordinator recognises from data sent by the sensor that there is a higher transmission requirement of the sensor and thus the trigger is sent from the coordinator to the sensor. In partly centralised scenarios, the switch instruction is sent from the sensor to the coordinator.

Since these partly centralised scenarios differ only in the above aspects from the previous scenarios, only the differing aspects are described in detail.

Figure 21A:
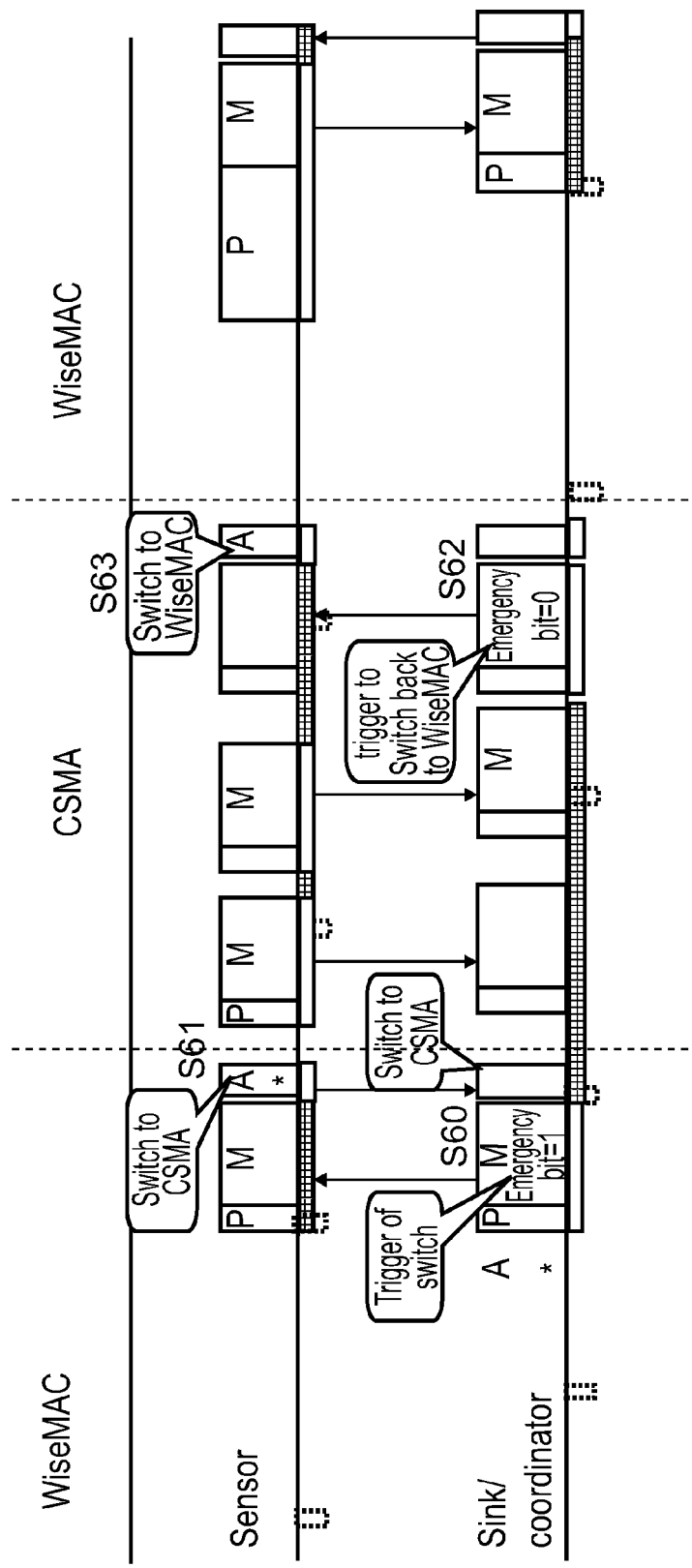
FIG. 21A is a block signal diagram illustrating switches between WiseMAC and CSMA in a partly centralised scenario with an emergency bit trigger.
Figure 21B:
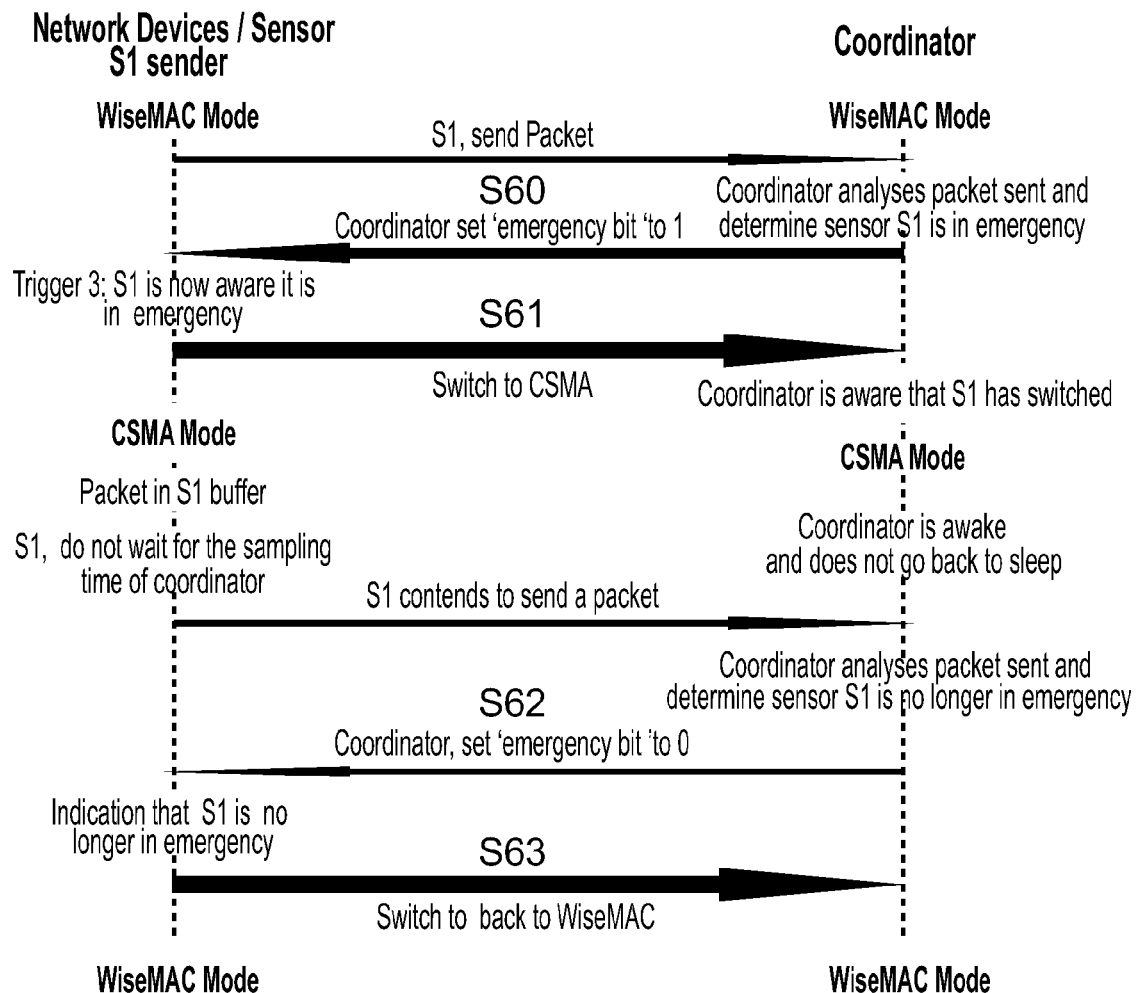
FIG. 21B is a signal flow depiction based on the signalling in FIG. 21A.

FIGS. 21A and 21B illustrate the partly centralised scenario of trigger 5, a partly centralised scenario, in which the emergency bit from coordinator triggers the switch to CSMA mode; and the switch is sent by the sensor.

The coordinator detects an emergency by analysing the life parameter packets sent by a sensor. Based on the analysis, the coordinator detects an emergency situation, and indicates that in a packet to the sensor with a trigger of a set emergency bit (S60). The sensor then sends an ACK in step S61 indicating the switch to CSMA mode with mode bit set to 1. Then the coordinator in turn switches to CSMA. After, further packets from the sender follow CSMA until the coordinator detects that there is no more emergency. This will be indicated in the message sent to the sensor with emergency bit set to 1 (trigger deactivated) in step S62.

Then the sender sends an ACK in step S63 with the bit mode set to zero to indicate to coordinator that it has switched back to WiseMAC.

Trigger 6 is a partly centralised scenario: the coordinator recognises the criticality of the situation and informs the sensor through u1&u2 bits; there is no battery status consideration. According to trigger 6, the urgency bits as previously described are used. Since this is a partly centralised scenario, it is the coordinator that recognises the criticality of the situation and sends the trigger as u1&u2 bits.

Figure 22A:
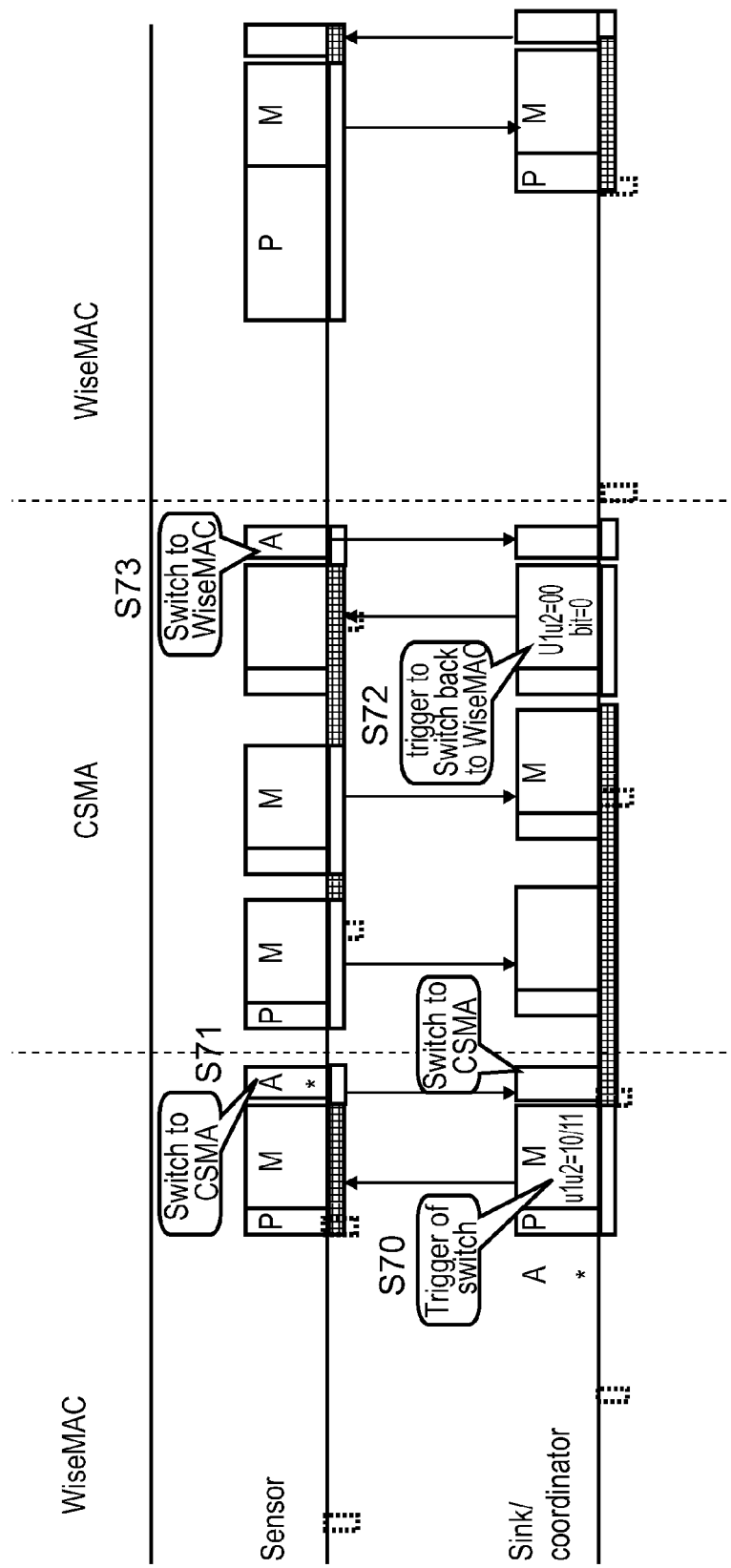
FIG. 22A is a block signal diagram illustrating switches between WiseMAC and CSMA in a partly centralised scenario with an urgency bit trigger.
Figure 22B:
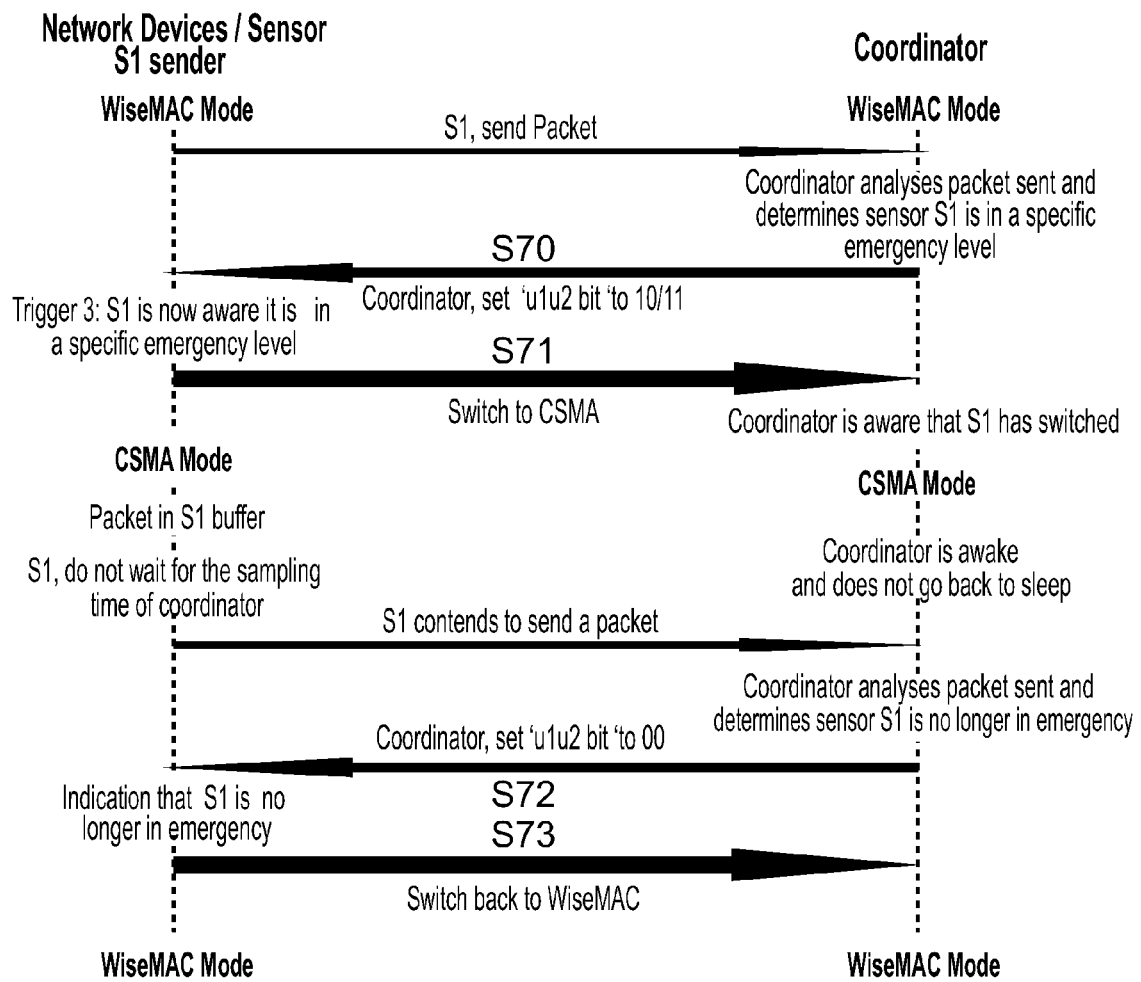
FIG. 22B is a signal flow depiction based on the signalling in FIG. 22A.

FIGS. 22A and 22B set out the scenario.

The sensor sends data to the coordinator as usual. The coordinator analyses the message and compares it to a certain thresholds or derives the urgency level in any of the other ways previously described. According to the sensor parameter level, the coordinator sends back a message in step S70 to the sensor with urgency bits u1 & u2 to inform it if it is in emergency by setting the bits u1 and u2 appropriately according to the level of emergency. The sensor sends a message S71 to inform the coordinator to switch the mode of operation to CSMA to handle the emergency situation. Then the coordinator switches to CSMA to increase its availability. When the sensor is no longer in an emergency situation as identified by coordinator in step S72, the sensor informs the coordinator that it is about to switch back to WiseMAC in step 73.

Previous partly distributed and partly centralised scenarios give the sensor some degree of autonomy/processing power. In the following fully centralised scenario, both a trigger and the switch instructions are sent from the coordinator to the sensor. In other respect, the scenarios correspond to the previous scenarios and therefore detailed description of these corresponding parts is omitted for simplicity.

Figure 23:
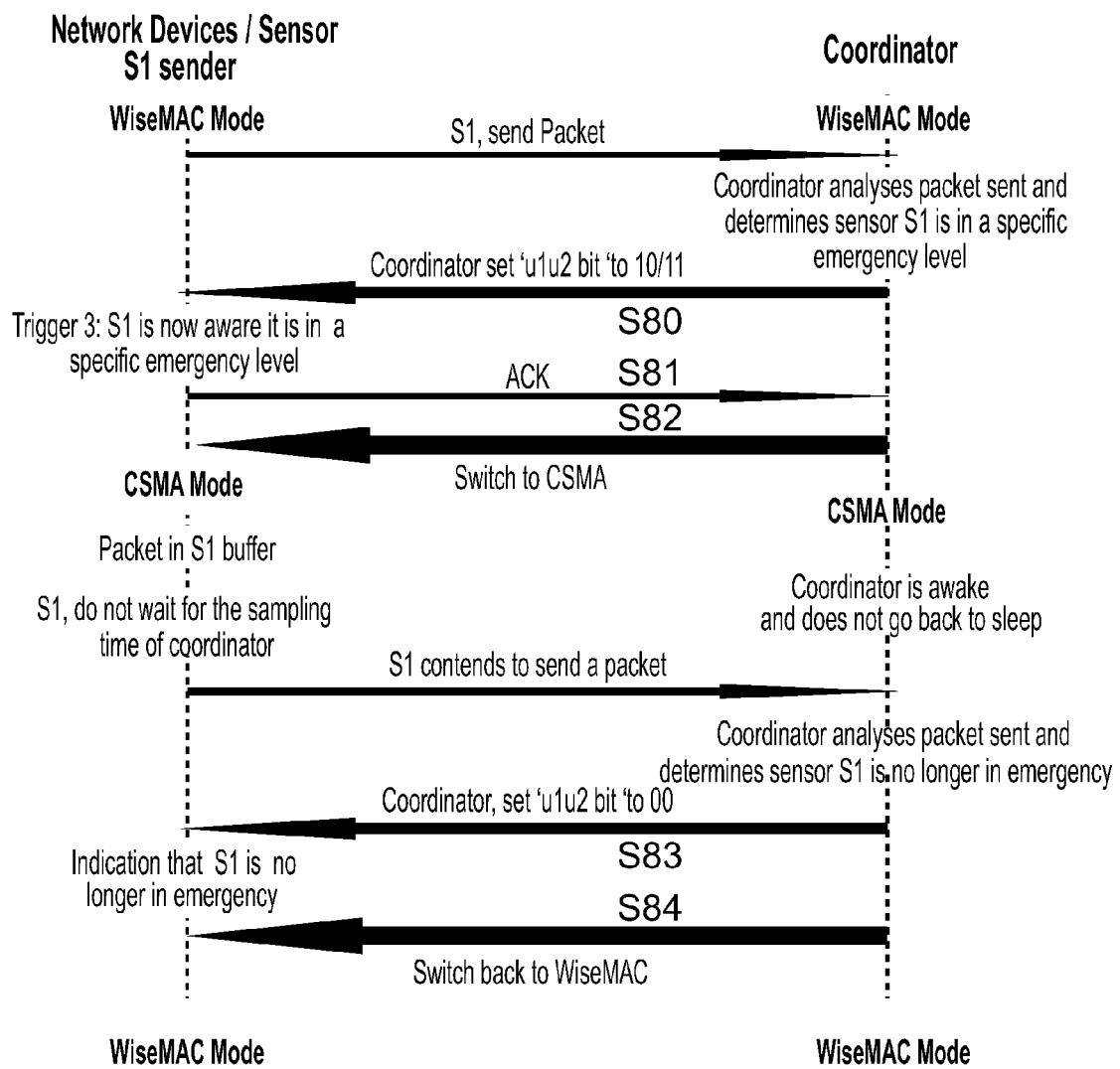
FIG. 23 is a signal flow diagram in a fully centralised scenario showing switches between WiseMAC and CSMA.

Trigger 7 is a fully centralised scenario: the coordinator recognises the criticality of the situation and informs the sensor through u1 &u2 bits; there is no battery status consideration. FIG. 23 is a signal flow diagram in a fully centralised scenario, showing switches between WiseMAC and CSMA.

The sensor sends data to the coordinator as usual. The coordinator analyses the data and produce urgency bits as before, by setting the bits u1and u2 sent in step S80 appropriately according to the level of emergency. The sensor may acknowledge the trigger which is shown in step S81. Then, the coordinator sends a message S82 to inform the sensor to switch the mode of operation to CSMA to handle the emergency situation. The coordinator switches to CSMA to increase its availability. When the sensor is no longer in an emergency situation as identified by coordinator, and transmitted to the sensor using the urgency bits in step S83, the coordinator informs the sensor to switch back to WiseMAC in S84. The diagram illustrates the switching in the fully centralised scenario without battery consideration. Trigger 8 is a fully centralised scenario: the coordinator recognises the criticality of the situation and informs the sensor through the trigger factor of u1&u2 bits; the other trigger factor is through b1&b2 sent from sensor to coordinator; the coordinator decides on the switch.

Here, therefore, battery status is taken into consideration for activating the switch. Thus trigger factor of the urgency bits is sent from the coordinator to the sender, but the coordinator carries out a subsequent battery level check using battery bits sent from the sender to the coordinator to give the second trigger factor before activating any access mode switch. The skilled reader will appreciate that in this scenario, the urgency bits correspond purely to the transmission requirements of the sensor since the battery level is not yet taken into consideration at that stage. Accordingly, the battery bits are a simple indicator of battery level.

Reference is made to the previous tables of urgency bits and battery status bits.

Figure 24A:
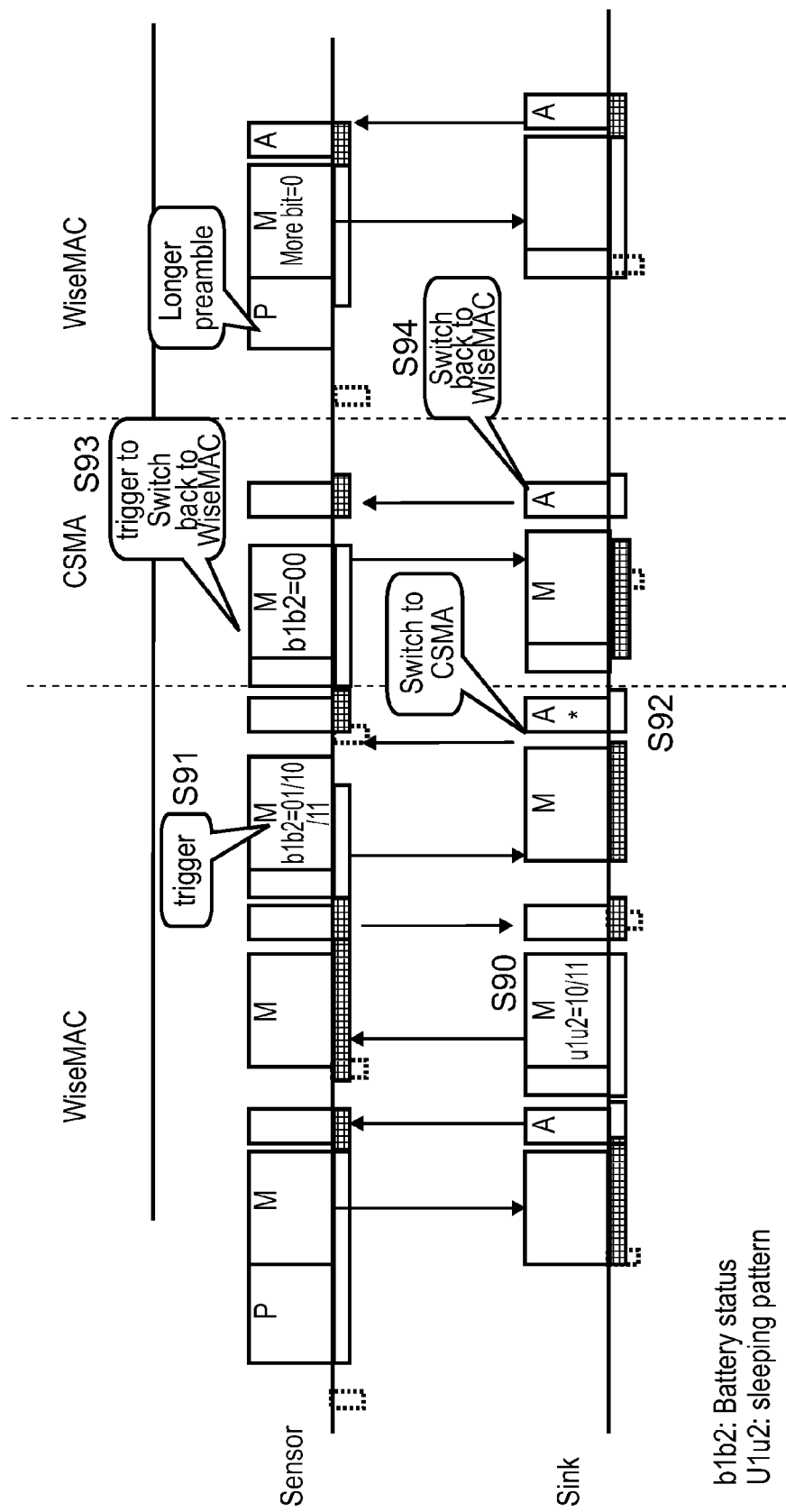
FIG. 24A is a block signal diagram in another fully centralised scenario showing switches between WiseMAC and CSMA.
Figure 24B:
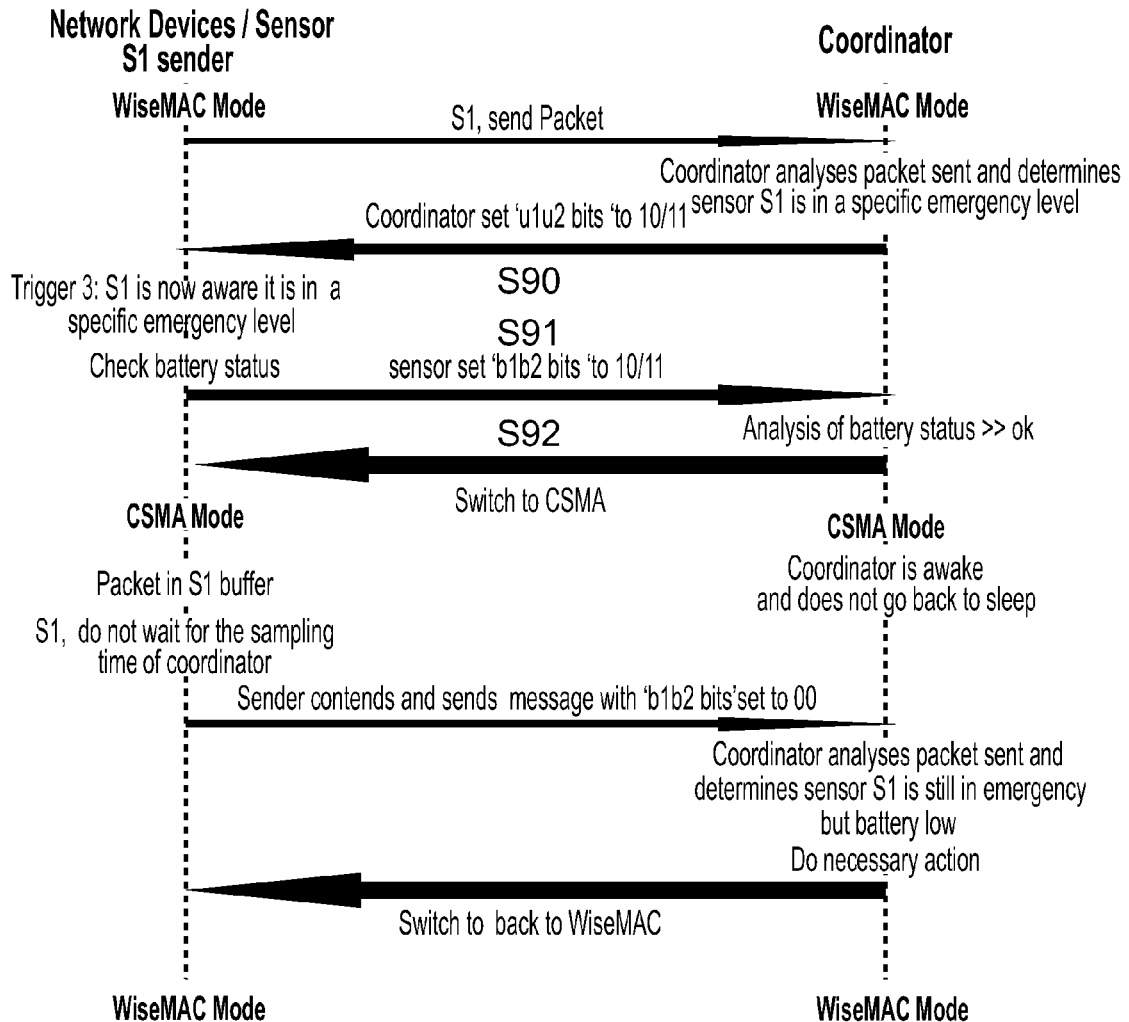
FIG. 24B is a signal flow diagram based on the signalling in 24A.

FIGS. 24A and 24B illustrate this scenario. The sensor sends data to the coordinator as usual. The coordinator analyses the data and produces urgency bits, sending back a message to sensor to inform it that it is in emergency by setting the bits u1 and u2 appropriately according to the level of emergency in step S90. Then, the sensor checks the battery level and sends it to the coordinator in step S91. If battery status is ok, the coordinator sends a message in step S92 to switch the mode of operation to CSMA to handle the emergency situations. If the battery is low, the coordinator does not cause the sensor to change its mode of operation, but takes the necessary action to handle the emergency case and the low battery.

If the battery is low as indicated by battery bits sent in step S93 and sensor is still in emergency, the coordinator sends the switch of mode message to sensor to switch back to WiseMAC in step S94 and then coordinator do the necessary reaction. FIGS. 24A and 24B illustrate the switching to CSMA mode and the switching back to WiseMAC due to low battery.

Figure 25A:
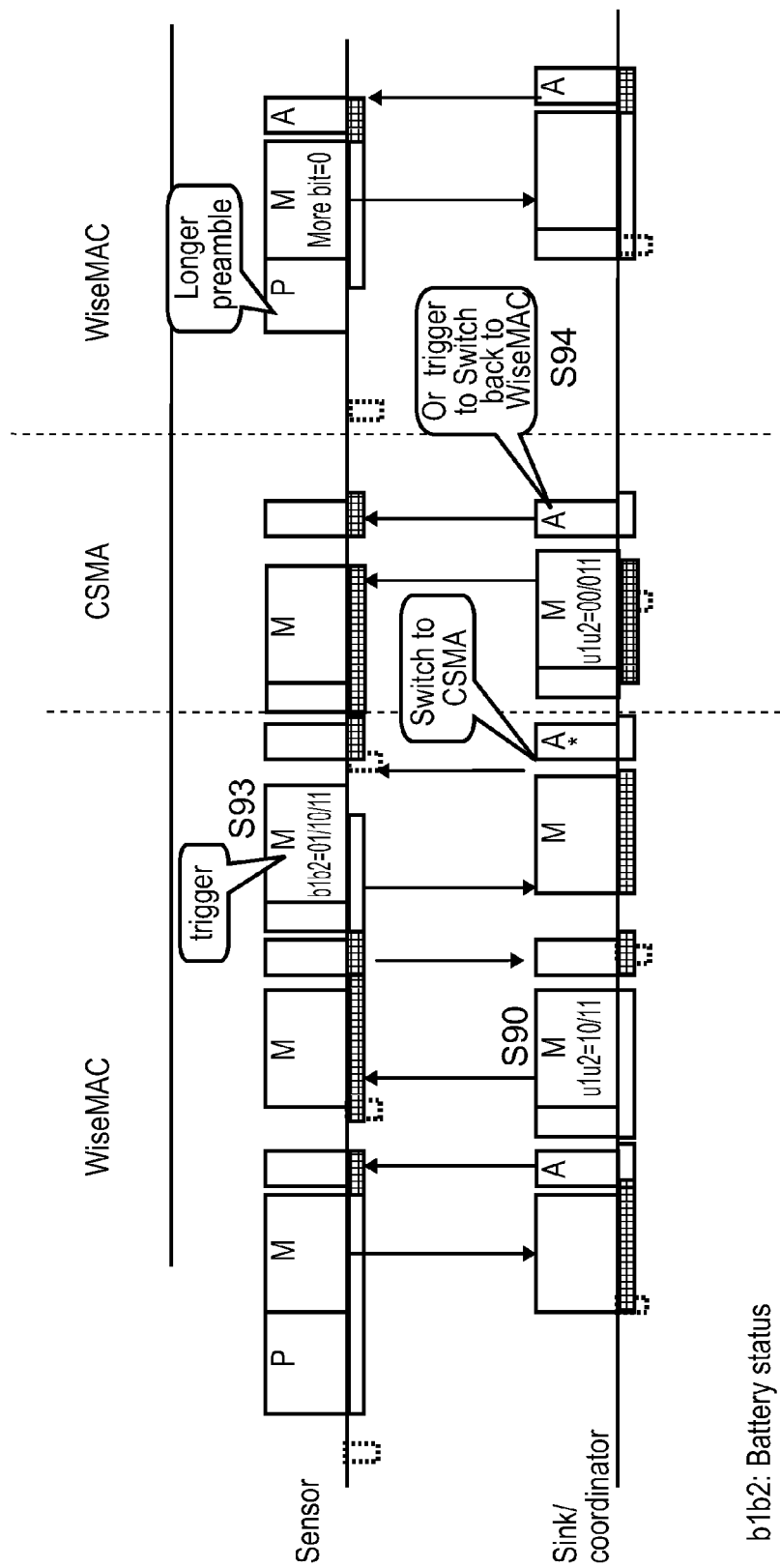
FIG. 25A is a block signal diagram in another fully centralised scenario showing switches between WiseMAC and CSMA.
Figure 25B:
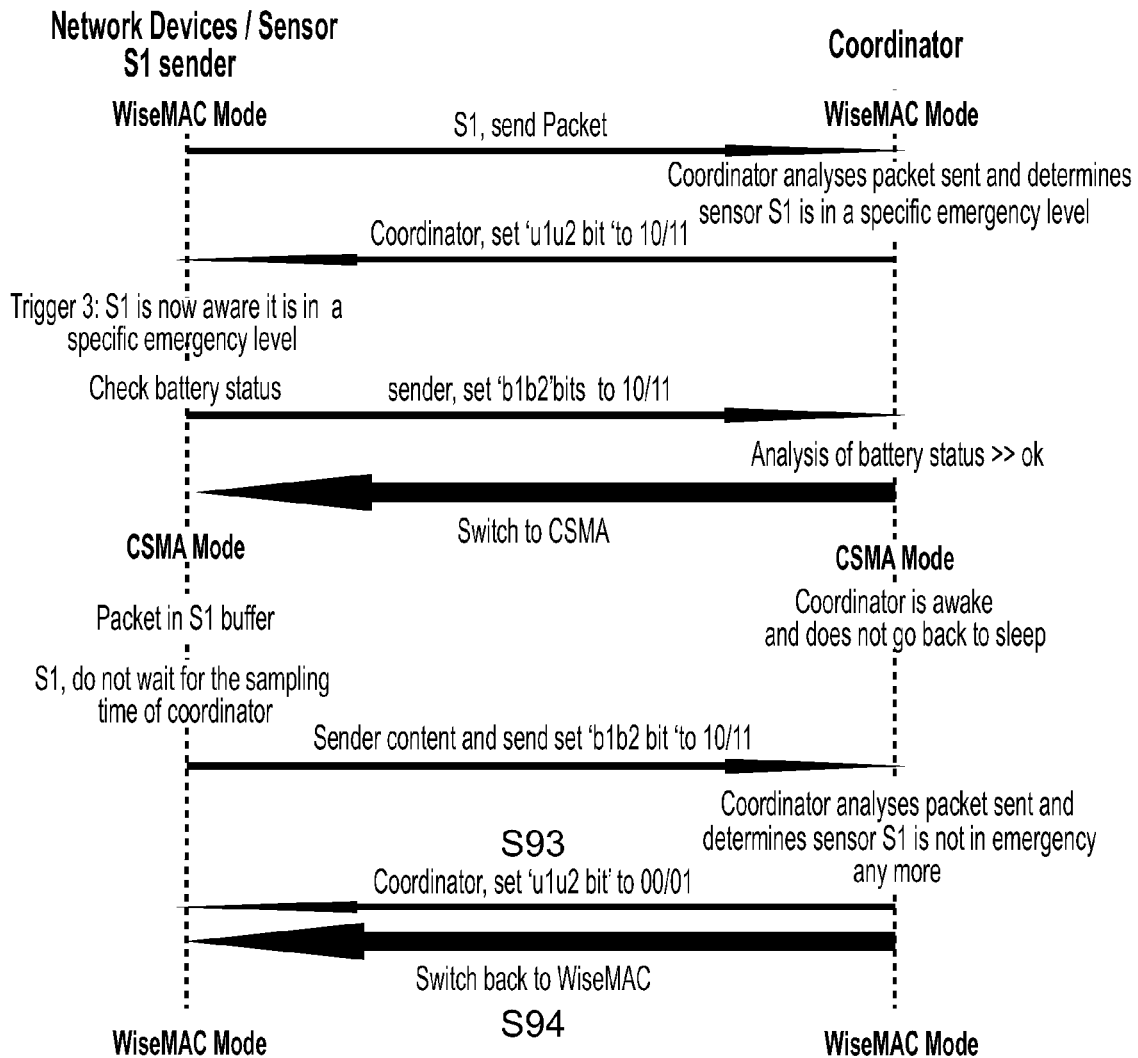
FIG. 25B is a signal flow diagram based on the signalling in 25A.

On the other hand when the sensor battery is low and the sensor is not in emergency, the coordinator can send the switch back message to WiseMAC to the sensor and take the necessary action to handle the low battery situation. FIGS. 25A and 25B illustrate the case of switching when emergency is lifted. Here in FIGS. 25A and 25B, step S93 shows the coordinator sending urgency bits through to the sensor and a switch instruction sent from the coordinator as step S94. Alternatively the sensor may send the urgency bits to the coordinator, and then the coordinator may instruct the switch in step S94. The second option is less centralised.

Trigger 8: shows a centralized scenario where a sensor in emergency and battery status is ok, the switch back is caused by lifting the emergency indication. This last scenario is classed as a centralised scenario because the switch and at least one of the factors for the combined trigger is handled by the coordinator Multiple Emergency Management This section describes situations where multiple devices go into emergency at the same time and the protocols according to invention embodiments that handle them. Two scenarios are envisioned and described: 1) the sensors (or other network devices) have the same level of emergency (see FIG. 26) and 2) sensors have different emergency levels (see FIG. 27). Both scenarios are centrally controlled by the coordinator.

Figure 26:
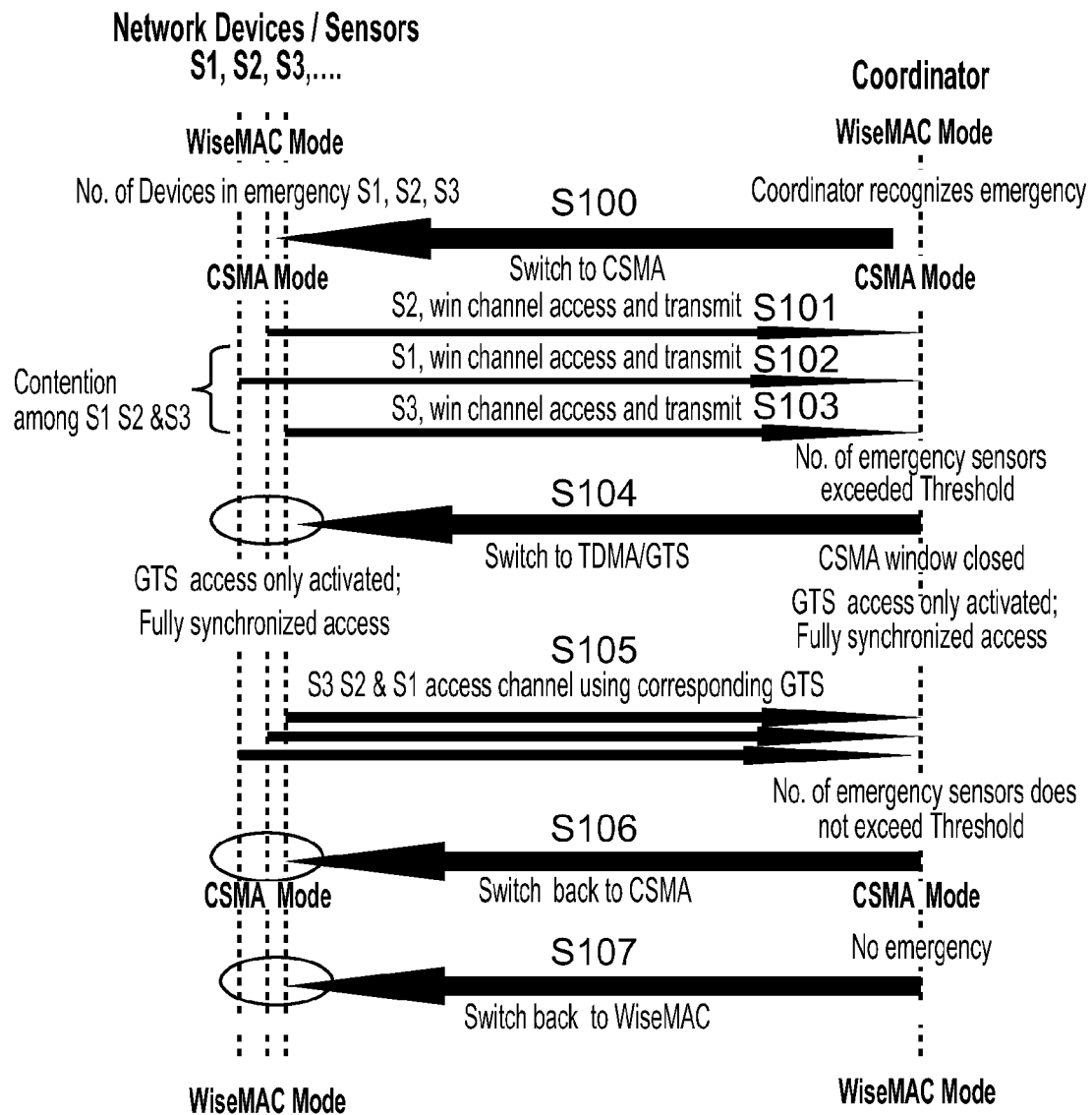
FIG. 26 is a signal flow diagram showing a number of devices in emergency of the same level.

In scenario 1 the devices/sensors are in emergency with same level of emergency. When there is no emergency state the sensors go to sleep most of the time and wake up periodically to check up for channel activity. We assume that the sensors initially follow the WiseMAC protocol in the absence of emergency for channel access. A number of sensors then goes to emergency state with the same level of urgency. The sensors have to change their sleeping pattern and be more awake to handle the emergency situation. The coordinator informs the involved sensors to change their mode of operation from WiseMAC to CSMA mode to improve throughput and availability as set out in previous embodiments (step S100). In this case, the involved sensors have to compete among themselves to access the channel as shown in FIG. 26 steps S101 to S103. Also they may compete with other sensors not in emergency case during their sampling period and if they have data to send. The preamble of a packet is usually chosen randomly to avoid collision between competitors. In invention embodiments this preamble may be chosen so that its length is inversely proportional to the level of emergency, the non emergency sensors thus being given lower priority over the emergency sensors. If the number of sensors with an emergency situation exceeds a certain threshold, the coordinator can decide to switch (in step S104) to a more synchronous and guaranteed network mode of operation such as TDMA/GTS. The coordinator thus sends out a beacon with GTS specification for the sensors involved (that is, the triggered sensors) in order to access the channel. The involved sensors transmit on their allocated slots in step S105 for a number of periods or until the emergency situation is lifted. If the number of emergency sensors falls below the threshold, the coordinator informs the sensors to switch back to CSMA mode.

Figure 27:
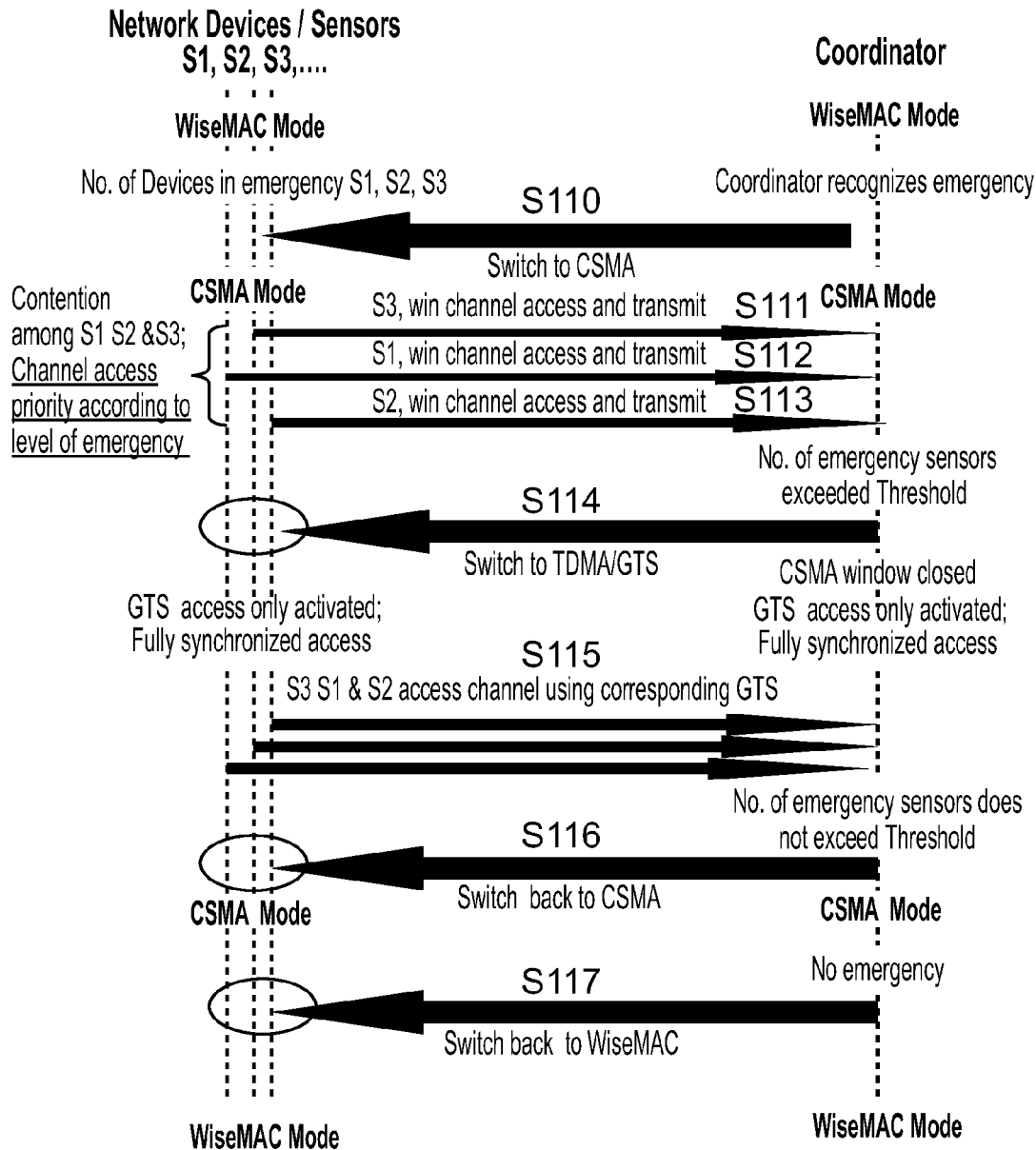
FIG. 27 is a signal flow diagram showing a number of devices in emergency of a different level.

Furthermore, if the emergency is lifted, the coordinator informs the involved sensors to switch back to WiseMAC in step S107 which is the default network operation mode in the absence of an emergency. In scenario 2 the devices/sensors are in emergency with different level of emergency. FIG. 27 shows the switching protocol in emergency situation when a number of devices are in emergency and have different level of emergency.

As before, when there is no emergency state, the sensors go to sleep most of the time and wake up periodically to check up for channel activity. We assume that the sensors initially follow the WiseMAC protocol for channel access in the absence of an emergency. Then, a number of sensors goes to an emergency state with different level of emergency. The sensors have to be more awake to handle the emergency situation. Therefore, the coordinator informs the involved sensors in step S110 to change their mode of operation to CSMA to improve throughput and availability. In this case, the involved sensors have to compete among them to access the channel as shown in steps S111 to S113. Also they may compete with other sensors not in emergency case during their sampling period and if they have data to send.

The preamble of a packet is usually chosen randomly to avoid collision between competitors. In some invention embodiments, this preamble is chosen so that its length is inversely proportional to the level of emergency, thus giving the non emergency sensors lower priority with respect to the involved (triggered) sensors. In addition, the sensors with higher emergency will be given priority over sensors with lower emergency. If the number of involved sensors with emergency situation exceed a certain threshold, the coordinator informs them (S114) to switch to a more synchronous and guaranteed mode of network operation such as TDMA/GTS.

The sink sends out a beacon with GTS specification for the sensors involved. The involved Sensors transmit on their allocated slots for a number of periods or until emergency situation is lifted (S115). If the number of sensors in emergency falls below the expected threshold, the coordinator informs the involved sensors (S116) to switch back to CSMA mode. If the emergency is lifted (for example, if all the triggers are lifted), coordinator informs the involved sensors to switch back to WiseMAC (S117) as it is the default mode of network operation in the absence of emergency.

The following description indicates how new signalling protocols for sending emergency bits, urgency bits and battery level bits (each of which can provide and access-change field) can be accommodated within a communication standard such as IEEE 802.15.6 which is currently under development based on IEEE 802.15.4. The IEEE 802.15.4 frame format already introduces a frame pending bit.

FIG. 28 illustrates one possible modification to the IEEE 802.15.4 frame format to indicate urgency of the message so that the urgent message is assigned high priority over others. Two urgency bits 81, 82 are shown and are employed by the sensor in transmission frames such as any or all of data frames, acknowledgement frames and MAC command frames, for example to indicate the changing sleep pattern of the sensor to the coordinator.

These urgency bits can also be used to differentiate between non-medical and medical devices as shown for example in Table 1 or for differentiation of priority between different device types in an industrial application. As can be seen from the comparison with FIG. 10, the frame control is extended by one octet in which two bits (urgency U1 and urgency U2) are used to indicate different levels of urgencies which correspond to different sleep patterns.

FIG. 28 additionally includes two bits 83, 84 related to the battery level. The bits are shown as battery level 1, L1 and level 2, L2. In some cases the urgency bits may not reflect the actual sleep pattern in operation but may instead show a suitable sleep pattern, even if it cannot be implemented because it is not allowed due to battery level considerations. Equally the battery bits may need to be viewed in conjunction with the urgency bits as an indication of the actual sleep pattern implemented taking the battery level into account.

FIG. 28 also shows the required corresponding modifications to IEEE 802.15.4 frame control fields to include an emergency bit and two bits denoting an acknowledgement type. For backward compatibility, the reserved bits (7-9) of IEEE 802.15.4 are used for these emergency and acknowledgement types. The IEEE 802.15.4 modified frame type is shown in FIG. 29. For backward compatibility, reserved bits 100-111 are used to indicate the different type of ACK frames and an emergency frame which is a new type of frame created for emergency situations.

Starting a standard from a "green field" approach, the enhancements mentioned above could be included in the frame control using the following:
  Two bits for ACK types
  Two bits for urgency levels
  Two bits for battery levels
  Three bits to indicate the type of frame Moreover the frame type in the control frame could include values to indicate any of the following in addition to other type frames such as data frame, MAC frame and Beacon frame:
  Emergency frame
  ACK frame
  Immediate ACK frame
  Delayed ACK frame FIG. 30 illustrates the enhancements as part of a new standard such as IEEE 802.15.6. The Figure illustrates the proposed part of the header frame at the MAC layer, which could also include a frame pending bit. FIG. 31 shows a corresponding table of possible frame type bits.

FIG. 32 illustrates the basic format of a MAC frame in the current IEEE 802.15.4 standard indicating the location of the MAC Command octets. FIG. 33 illustrates the Command Frame Identifier list of the current version of IEEE 802.15.4 standard.

The embodiments of the present invention with control field signalling may use any combination of at least four bits (morebit u1 u2 b1 b2) in the MAC frame control of the MAC frame header to specify the states of a BAN device. These state information bits can all be set independently and combined in multiple ways for BAN, BAN traffic, and BAN device management, generally in, but not limited to, emergency situations. They may be sent in a MAC command frame as shown in FIG. 32, or any other type of transmission frame.

In an alternative solution, a new MAC command frame can be added, with a new command frame identifier added to the list in FIG. 33. The payload (if any) could be used to differentiate between device states using the bits previously mentioned or in some other way.

A further alternative and preferable approach suitable for any transmission frame type including MAC command frames, is to introduce a single octet outside the frame control but still in the MAC Header with the bits previously mentioned, or preferably an enumerated list of device states as shown below. This octet may provide a total of 256 possible device states, for example, but not limited to:

State ID—Device State Description
0x01—Normal (i.e. no emergency, battery normal)
0x02—No emergency, battery medium
0x03—No emergency, battery low
0x04—Emergency, battery normal
0x05—Emergency, battery medium
0x06—Emergency, battery low In order for a receiving device to know whether or not to read and interpret this field, a single "Device State" (ds) bit can be introduced into the MAC Frame Control to indicate read and interpret device state (ds=1) or ignore device state (ds=0).

Invention embodiments have the following advantageous aspects:
(1) The enhancement of WiseMAC HA to suit BAN standard especially the handling of emergency and video streaming. Embodiments also introduce novel Triggers to switch between operation modes on demand;
(2) Modification to WiseMAC HA protocol messages to suit BAN standard which encompasses novel triggers to inform the coordinator of emergency situations and also of increased traffic or streaming flow;
(3) A partly distributed scenario: emergency bit sent by sensor and switch coordinator; Trigger caused by emergency bit from sensor to switch to CSMA
(4) A partly distributed scenario: more bit indicating increased load or a streaming flow sent by sensor to coordinator; more bit triggers the switch to CSMA mode of operation and coordinator decides the switch
(5) Partly distributed scenario: sender recognises the criticality of the situation through the use of urgent bits and informs the coordinator; without battery status consideration (6) Partly distributed scenario: sender recognises the criticality of the situation through the use of urgent bits and Battery status bits and informs the coordinator; Coordinator decides the switch
(7) At least two new signalling elements we introduced to the existing protocols; the trigger and the switch
(8) Embedding detailed prioritization concepts to the existing switch protocol New protocols associated with new signalling element
(9) Centralised switching and signalling platform for joint operation of WiseMAC and CSMA based channel access
(10) Partly centralized scenario: emergency bit from coordinator triggers the switch to CSMA mode
(11) Partly centralised scenario: coordinator recognises the criticality of the situation and informs the sensor through urgent bits u1&u2; without battery status consideration
(12) Fully Centralised scenario: coordinator recognises the criticality of the situation and informs the sensor through u1&u2 bits; coordinator decides the switch
(13) Fully Centralised scenario: coordinator recognises the criticality of the situation and informs the sensor through u1&u2 bits; trigger through b1&b2 from sensor to coordinator; coordinator decides the switch; with battery status consideration
(14) Partly centralised with switching back is triggered through emergency bit (lifting emergency) sent by coordinator to sensor and coordinator decides the switch
(15) Partly centralised with switching back is triggered through u1 u2 (lifting emergency) sent by coordinator to sensor and coordinator decides the switch
(16) Fully centralised with Switching back is triggered trough b1&2 sent by sensor and coordinator decides the switch
(17) Fully centralised with switching back is triggered through u1 u2 (lifting emergency) sent by coordinator to sensor and coordinator decides the switch
(18) Switching protocol between different modes when devices/sensors are in emergency; devices/sensors have same level of emergency
(19) Switching protocol between different modes when devices/sensors are in emergency; devices/sensors have different levels of emergency
(20) Switching to a more guaranteed type mode TDMA/GTS in severe emergency conditions when a number of devices under emergency passes a certain threshold
(21) Switching back to a more relaxed mode such as CSMA when number of devices in emergency fall under a certain threshold The proposed switching criteria and associated protocols in invention embodiments for switching between the two channel access modes enable optimised operation of wireless BAN devices, both in terms of reduced latency for channel access and energy saving. Switching between WiseMAC and CSMA according to invention embodiments enables optimised operation of mixed medical and non-medical devices in the same wireless BAN.

Embodiments of the present invention may have a vital role to play in facilitating emergency management by use of MBANs. The following scenarios may be noted:

(i) Hundreds of millions of patients worldwide with cardiac and heart problems can be monitored in hospital or at home by employing wireless sensors forming an MBAN on their bodies. The MBAN can provide extra mobility for such patients. However, for this group of patients under situations such as abnormal heart functioning or more severe cases such as heart attack, it is vital to secure a reliable communication channel to make sure that no emergency or alarm signal will be missed.

(ii) Hundreds of millions of people worldwide suffer from diabetes. Implantable or non-invasive methods for glucose measurement have been considered recently. An MBAN can be used to monitor a patient's glucose level information on a 24-hour basis. There are situations where the patient's glucose level is off the chart and emergency geolocation and other necessary urgent medical procedures for the patients are required.

(iii) MBANs may be used to gather sensed data while monitoring a patient in intensive care where the loss of data could be life threatening.

(iv) Although primarily envisaged for low data-rate applications, MBANs could have application to transfer of streaming video/audio data where loss of individual packet is crucial and affects the quality. Erroneous data may have a negative impact on the diagnosis of illness in emergency cases.

(v) For medical diagnosis, MMR or X-ray images need to be very clear in order for the doctor to diagnose properly the patient. Again, therefore, reliable data transfer is essential.

The present invention may take the form of a novel network, network device (or sensor), coordinator, or hardware modules for the same, and can be implemented by replacing or modifying software executed by processors of the sensor(s) and/or the coordinator.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to IEEE 802.15.4 and IEEE 802.15.6 by way of example, the invention may be applied to any type of MBAN whether or not operating in accordance with IEEE 802.15.6, as well as to other types of BAN and other short-range wireless networks, including WSNs which even if not medical body area networks nevertheless have a requirement for improved reliability of communication in emergency situations.

The invention claimed is:

1. A wireless network of devices, comprising:
 a coordinator comprising transmission and reception means for wireless communication; and
 a plurality of network devices comprising transmission means and reception means for wireless communication; and
 control means operable to selectively cause a device to communicate according to two different channel access schemes, a higher throughput scheme and a lower throughput scheme;
 wherein a trigger is provided in the network for a switch from the lower throughput scheme to the higher throughput scheme,
 wherein the trigger is a combined trigger created based on a combination of trigger factors related to the network device's transmission requirements, the trigger factors including emergency and/or urgency status of the network device and battery level of the network device, transmitted in a form of emergency/urgency bits and battery bits, respectively, wherein the combined trigger is determined by a combination of the emergency/urgency bits and the battery bits, and when the battery bits indicate a low battery level, the coordinator does not enforce a switch to the higher throughput scheme, even when the emergency/urgency bits for the network device indicate an emergency situation, wherein the network is operable to create triggers for more than one of the plurality of network devices, and wherein if triggers for more than a predetermined number of the network devices are created at a given time, the network is operable to switch at least those network devices with created triggers to contention-free communication.

2. The wireless network according to claim 1, wherein the trigger factors further include data waiting in the network device's buffer.

3. The wireless network according to claim 1, wherein the network device transmission means and/or coordinator transmission means is operable to transmit an indication of the trigger in an access-change field of a transmission frame, preferably using a value set in the field to a predetermined value.

4. The wireless network according to claim 1, wherein one or more of the trigger factors is transmitted in an access change field of a transmission frame.

5. The wireless network according to claim 1, wherein the switch from the low throughput channel access scheme to the high throughput channel access scheme is based on a switch instruction activated by the trigger.

6. The wireless network according to claim 1, wherein a different value in an access-change field creates a discontinuation of the trigger, and activates a switch instruction back to the lower throughput channel access scheme.

7. The wireless network according to claim 1, wherein the network device transmission means and/or coordinator transmission means is operable to transmit an indication of a switch instruction in a field of a transmission frame, preferably using a value set in the field to a predetermined value.

8. The wireless network according to claim 7, wherein the indication of the switch instruction is provided in an acknowledgement frame.

9. The wireless network according to claim 7, wherein the network device is one of a plurality of network devices in the network, the network being operable to create triggers for more than one of these network devices, wherein each of the network devices is assigned a priority in line with its device type and/or transmission requirements, and wherein the network device priorities are used to determine a transmission parameter in the higher throughput scheme which influences the chances of successful transmission.

10. The wireless network according to claim 7, wherein uplink and downlink transmissions both switch from the low-throughput scheme to the high-throughput scheme at the time of the switch.

11. The wireless network according to claim 1, wherein the contention-free communication uses guaranteed time slots, preferably by switching the network devices to a further channel accesses scheme.

12. The wireless network according to claim 1, wherein either the trigger or the switch or both are created in the coordinator.

13. A particular network device in a wireless network of devices including a plurality of network devices and a coordinator, the particular network device comprising:

transmission means and reception means for wireless communication; and control means operable to selectively cause the particular network device to communicate according to two different channel access schemes, a higher throughput scheme and a lower throughput scheme;

wherein the transmission means and/or reception means are operable to transmit and/or receive respectively a trigger for a switch from the lower throughput scheme to the higher throughput scheme, the network being operable to create triggers for more than one network device;

wherein the trigger is a combined trigger based on a combination of trigger factors related to the particular network device's transmission requirements, the trigger factors including emergency and/or urgency status of the particular network device and battery level of the particular network device, transmitted in a form of emergency/urgency bits and battery bits, respectively;

wherein the combined trigger is determined by a combination of the emergency/urgency bits and the battery bits, and when the battery bits indicate a low battery level, the coordinator does not enforce a switch to the higher throughput scheme, even when the emergency/urgency bits for the network device indicate an emergency situation, and wherein if triggers for more than a predetermined number of the network devices, including the particular network device are created at a given time, the particular network device and other network devices with created triggers are operable to switch to contention-free communication.

14. The network device according to claim 13 in a wireless sensor network, the network device further comprising sensing means operable to detect values of a parameter.

15. A coordinator in a wireless network of devices including a plurality of network devices and the coordinator, wherein the coordinator comprises transmission and reception means for wireless communication;

control means operable to selectively cause the coordinator to communicate according to two different channel access schemes, a higher throughput scheme and a lower throughput scheme;

wherein the transmission means and/or reception means are operable to transmit and/or receive respectively a trigger for a switch from the lower throughput scheme to the higher throughput scheme;

wherein the trigger is a combined trigger based on a combination of trigger factors related to the network devices transmission requirements, the trigger factors including emergency and/or urgency status of network device and battery level of the network device, transmitted in a form of emergency/urgency bits and battery bits respectively; and wherein the combined trigger is determined by a combination of the emergency/urgency bits and the battery bits, and when the battery bits indicate a low battery level, the coordinator does not enforce a switch to the higher throughput scheme, even when the emergency/urgency bits for the network device indicate an emergency situation, wherein, the coordinator is operable to create triggers for more than one of these network devices, and wherein if triggers for more than a predetermined number of the network devices are created at a given time, the coordinator is operable to switch at least those network devices with created triggers to contention-free communication.

\* \* \* \* \*